June 27, 1961 H. W. CORDES 2,990,499

UNIVERSAL DIODE BOARD

Filed Jan. 2, 1958 11 Sheets-Sheet 1

June 27, 1961 H. W. CORDES 2,990,499

UNIVERSAL DIODE BOARD

Filed Jan. 2, 1958 11 Sheets-Sheet 2

June 27, 1961 H. W. CORDES 2,990,499

UNIVERSAL DIODE BOARD

Filed Jan. 2, 1958 11 Sheets-Sheet 4

June 27, 1961 H. W. CORDES 2,990,499

UNIVERSAL DIODE BOARD

Filed Jan. 2, 1958 11 Sheets-Sheet 5

June 27, 1961 H. W. CORDES 2,990,499

UNIVERSAL DIODE BOARD

Filed Jan. 2, 1958 11 Sheets-Sheet 7

June 27, 1961 H. W. CORDES 2,990,499

UNIVERSAL DIODE BOARD

Filed Jan. 2, 1958 11 Sheets-Sheet 8

June 27, 1961 H. W. CORDES 2,990,499

UNIVERSAL DIODE BOARD

Filed Jan. 2, 1958 11 Sheets-Sheet 9

June 27, 1961 H. W. CORDES 2,990,499

UNIVERSAL DIODE BOARD

Filed Jan. 2, 1958 11 Sheets-Sheet 11

United States Patent Office 2,990,499
Patented June 27, 1961

2,990,499

UNIVERSAL DIODE BOARD

Harry W. Cordes, Palo Alto, Calif., assignor to Friden, Inc., a corporation of California Filed Jan. 2, 1958, Ser. No. 706,797
6 Claims. (Cl. 317—101)

This invention relates to computing machines in which values entered therein may be transmitted to recording apparatus and more particularly to means for controlling the transmission of such values and the programming of each operation.

An object of the invention is to provide a unit panel for the readout mechanism of a computing machine to control the passage of current from the readout mechanism to the recording apparatus.

Another object of the invention is to provide a circuit control panel which is readily adaptable to a computing machine to control the transmission of values from the computing machine to a recording device.

Another object of the invention is to provide a diode board which may be readily modified to change the programming of an operation of a computing machine in combination with an electrically controlled recording device.

Another object of the invention is to provide a relatively small circuit control panel for an electrically controlled device in which a multiplicity of electrical components may be easily inserted or removed to modify the electrical programming of a plurality of operations.

A further object of the invention is a provision of a program circuit control panel by means of which the programming of electrically controlled operations may be easily and quickly modified.

Further objects and advantages will be apparent from the following description of the invention as illustrated in the accompanying drawings in which.

The invention as shown and described is embodied in an Add-Punch computing machine which is operable to add and subtract and to print records of the amounts entered in, and obtained by, computation in the machine. These amounts may also be recorded selectively by coded perforations in a tape under the control of a perforating device operating in combination with the computing mechanism of the machine. This combination, in general, is of the type shown and described in the patent to Harold J. Chall et al, No. 2,861,739 issued November 25, 1958.

Figure 1:
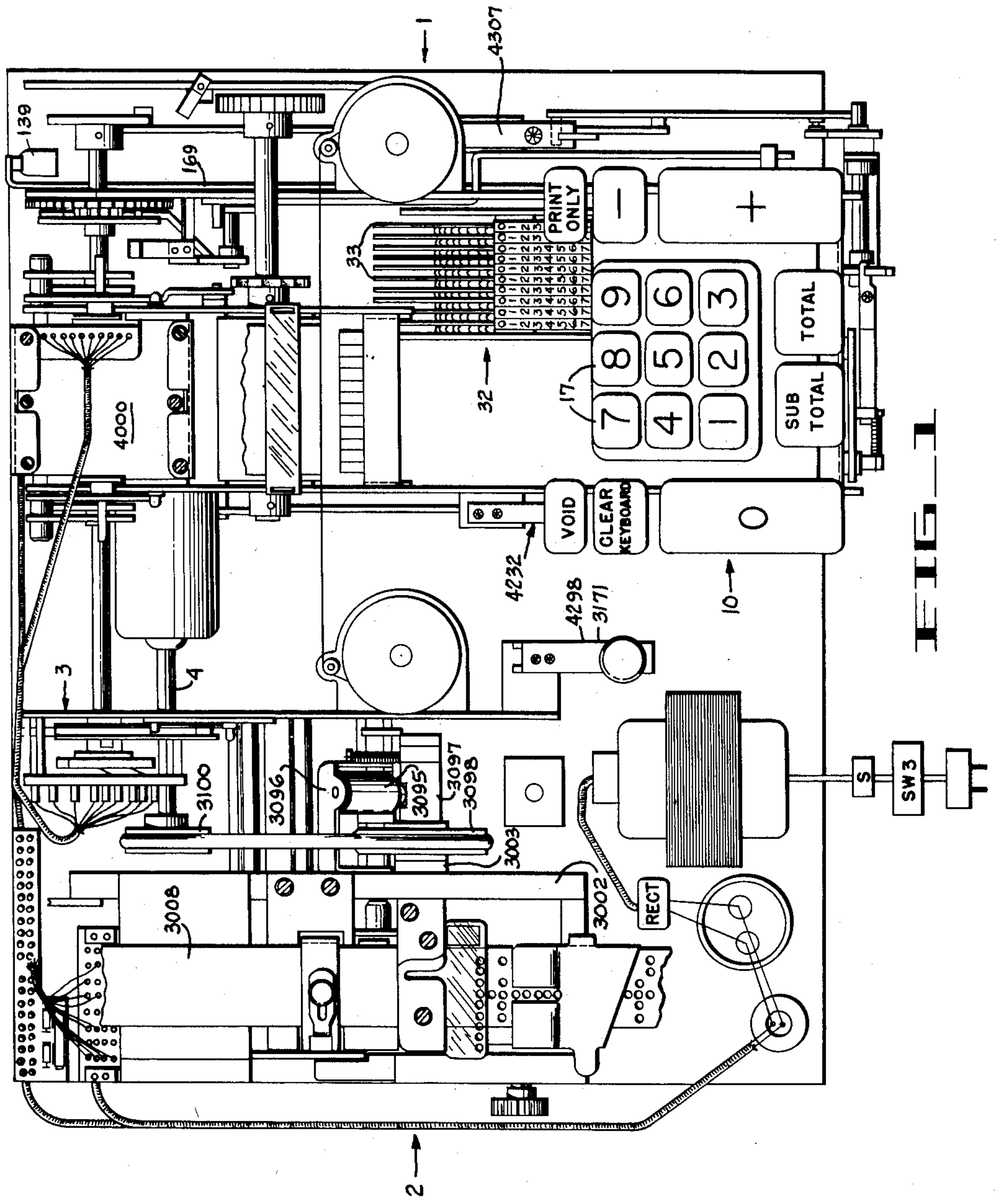
FIG. 1 is a plan view of the device incorporating the invention.

As shown in FIG. 1, this apparatus comprises a computing apparatus generally indicated at 1, and a tape perforating apparatus, generally indicated at 2. The computing apparatus and the tape perforating apparatus are disposed in side-by-side spaced relation and are electrically and mechanically coupled through a system commutator switch 3 and a power transmitting shaft 4. The computing apparatus 1 is operable to receive and record entries of values, such as are normally received and recorded by a computing apparatus, to compute from these entries, the sums or differences in the individual amounts entered, and to record subtotals and totals as required. The operation of the tape perforator 2 is effective to make perforated records in a tape with electromagnetic devices in the tape perforator 2 controlling the pattern of perforations made in the tape in accordance with signals coming into the tape perforator from some remote point such, for example, as the electrical control system involving the commutator switch 3, the operation of which is determined by an electrical association with the electrical readout switch 4000 provided in the computing apparatus 1. The amounts to be recorded on the tape are entered into the readout switch 4000 during computation in the computing apparatus, the switch 4000, through the electrical association with commutator switch 3, controlling the operation of the tape perforator 2.

The computing apparatus employed in the present invention comprises, in addition to a suitable base, a mechanism supporting framework and a mechanism cover, digitation mechanism including a ten-key keyboard, and a series of selection segments which are sequentially set to selected values from the highest to the lowest order corresponding to values entered therein by manual depression of selection keys of the keyboard. The computing apparatus also comprises a printing mechanism, an accummulator, a power-driven actuator controlled by the selector mechanism, power cycling mechanism, a positive transmission which drivingly connects the actuator with the conventional printing mechanism at all times and, alternatively, connects the actuator with the selector mechanism or the accumulator, and a negative transmission which, at times, connects the actuator to the accumulator. As diagrammatically indicated in FIG. 1, the computing apparatus is also provided with a set of control keys, including an addition (+) key, a subtraction (—) key, a TOTAL key, a PRINT ONLY key, a KEYBOARD CLEAR key and a VOID key.

It is to be noted, that those parts of the mechanism disclosed herein, which are duplicates of the Chall et al. device disclosed in Patent No. 2,861,739 will be provided with identical reference numerals used in the aforementioned patent.

*Selection mechanism*

The selection mechanism includes a pin carriage which, upon depression of the numeral value keys 17, is laterally shiftable relative to the keyboard 10, the actuator, and the accumulator under control of an escapement mechanism. The digits of a value consisting of any number of digits within the capacity of the selection mechanism are simultaneously transmitted through the actuator to the printing mechanism and the accumulator upon the operation of the addition or subtraction control keys.

Generally, the selection mechanism comprises a ten-key keyboard including keys 17 and, associated therewith, a pin carriage 32 having ten ordinal differentially adjustable rack segments 33 (FIGS. 1 and 2) in which the digits of a value may be set successively for subsequent entry into the accumulator 390. Upon each depression of a numeral key 17, the escapement mechanism (not shown) is operated to move the pin carriage one ordinal step to the left (FIG. 1) relative to the keyboard selection mechanism.

Upon depression of a key 17, the latch tooth 50, associated with the operatively aligned rack segment 33, is rocked to release the rack segment in a well-known manner for clockwise movement to a differentially set position in accordance with the key depressed.

*Actuator mechanism*

Figure 2:
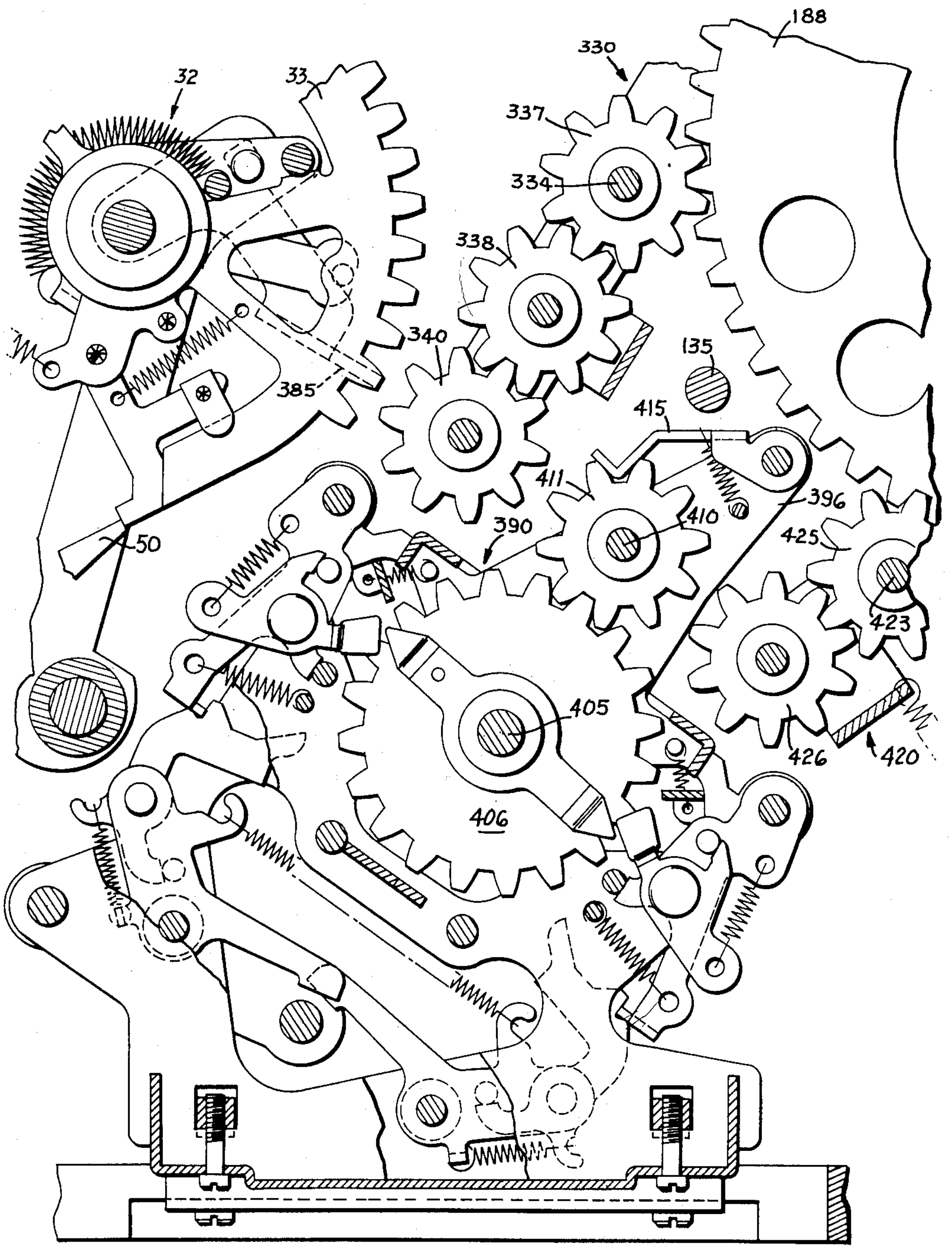
FIG. 2 is a sectional elevational view of the accumulator section of the computing mechanism.
Figure 3:
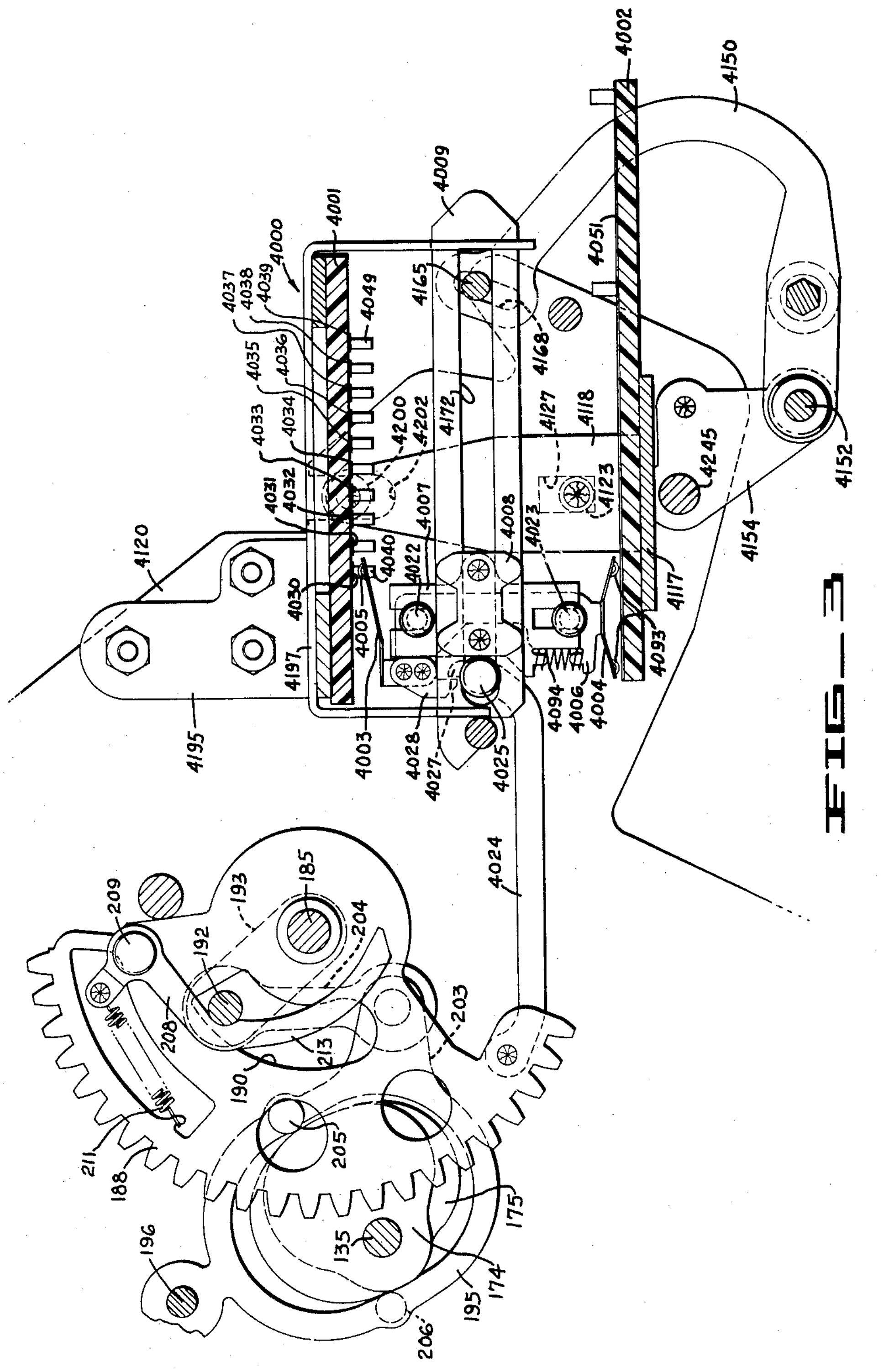
FIG. 3 is a sectional elevational view of the computer actuating mechanism and readout switch.

Referring to FIGS. 2 and 3, the actuator mechanism comprises shaft 185 journalled at its ends in intermediate frame plates of the machine and extending transversely of the machine above, and substantially parallel to, the main drive shaft 135. Actuator sectors 188, equal in number to the number of selector sectors 33 plus two, are journalled on shaft 185 and are ordinally arranged to correspond to the ordinal spacing of the sectors 33. Each actuator sector 188 is provided with an arcuate opening 190 of sufficient length to permit rocking movement of bail 192 extending transversely through the openings 190 and supported at its ends by similar arms 193 secured on shaft 185.

Yoke 195, of somewhat elliptical shape, surrounds main drive shaft 135 and the complementary cams 174 and 175 and is pivotally mounted on transverse shaft 196 supported in the framework of the machine. Ear 203 extends outwardly adjacent the lower end of yoke 195 and has a pivotal connection with the lower end of link 204, the upper end of which is pivotally connected to one end of actuator bail 192. One arm of yoke 195 carries roller 205 projecting from the right-hand side thereof and riding on the peripheral edge of cam 174, while the other arm of yoke 195 carries roller 206 projecting from the left-hand side of the yoke and riding on the peripheral edge of the cam 175, the yoke being disposed between cams 174 and 175.

With this arrangement, the bail 192 is positively moved, first downwardly and then upwardly and, during an operating cycle of the machine, is maintained in its lower position for a predetermined time interval and is subsequently restored to the upper, or normally inoperative, position shown in FIG. 3.

Each actuator sector 188 carries a latch lever 208 pivotally mounted at 209 on one side thereof, the free end of each lever 208 having an arcuate shape 213, the inner radial edge of which is provided with a concave seat normally resiliently maintained in engagement with bail 192 under the urgency of the associated spring 211. As the bail 192 is rocked counter-clockwise by the yoke 195, upon clockwise rotation of cams 174 and 175, each sector 188 is likewise rocked counter-clockwise by virtue of the engagement of bail 192 in the concave seat in the corresponding latch lever 208. If, however, the movement of a sector 188 is blocked or terminated, bail 192 moves out of the seat in the associated lever 208 and continues to be moved the extent of its movement.

It will be recalled that following the differential adjustment of each selection segment 33 in accordance with the value key 17 depressed, pin carriage 32 escapes ordinally relative to actuator sectors 188. A depression of the addition or subtraction key then becomes effective to initiate operation of the main drive shaft 135 to rock bail 192 counter-clockwise, as viewed in FIG. 3. With the rocking of the bail 192, each actuator sector 188, aligned with a corresponding selection segment 33, restores the segment to its "0" latched position. Whereupon, each sector 188 will have been rocked a differential extent in accordance with the digit represented by the corresponding selection segment 33. Upon reaching its "0" position, each selection segment 33 prevents further counter-clockwise rocking movement of the aligned or corresponding sector 188 and the latch lever 208 associated therewith yields to enable the full extent of movement of bail 192.

To control the restoration of each adjusted selection segment 33 to zero by the actuator sectors 188, a series of trains of gears, generally indicated at 330 (FIG. 2) is provided, one such train of gears 337, 338 and 340 for each actuator sector 188. Gears 337 are normally in mesh with corresponding sectors 188, while gears 340 are normally maintained in a neutral, or inoperative, position by means not shown, and become operative upon depression of the addition or substraction key to be rocked about shaft 334 into mesh with the adjusted actuator segments 33. Each of the sectors 188, which are to the left of the leftmost adjusted selection segment 33, as viewed in FIG. 1, is blocked against counter-clockwise movement by the engagement of locking bar 385 (FIG. 2) between teeth on gears 340 associated with those sectors. Bar 385 is secured to the left side frame member of the pin carriage 32 and extends laterally to the left therefrom.

Following the restoration of each adjusted selection segment 33 to its "0" position and therefore the differential adjustment of the corresponding actuator sectors 188 in accordance therewith, the value, which has been entered into the pin carriage 32, is transferred into accumulator 390 (FIG. 2). Accumulator 390 is secured as a unit between similar end frames 396 (FIG. 2) and comprises shaft 405 secured at its ends in side frame members 396, carrying a plurality of gears 406 rotatably mounted thereon and having an ordinal spacing similar to that of the corresponding actuator sectors 188. A conventional positive and negative tens-transfer mechanism is provided in association with gears 406 and is fully described in the Patent No. 2,861,739. A plurality of ordinally arranged accumulator drive gears 411 are journalled on the shaft 410 supported in frame plate members 396 and are enmeshed with the corresponding accumulator gears 406, the gear ratio being such that for each rotation of drive gear 411, the corresponding accumulator gear 406 is rotated 180°. Accumulator gears 406 are resiliently maintained in each rotated position by means of detents 415.

Following the differential setting of actuator sectors 188 representative of the value set in the selection mechanism 32 and the rocking of bail 192 to its extreme position, gears 340 of the positive gear transmission mechanism 330 are moved to the normally inoperative position out of mesh with the segments 33. Following the time interval delay of the bail 192 in its extreme position, the value entered into the selection mechanism 32 may be transferred additively or subtractively into the accumulator 390, as determined by a depression of the addition or subtraction key, respectively, and the rocking of the positive gear transmission 330 or negative gear transmission 420 into operative position relative to actuator accumulator drive gears 411. The negative gear transmission assembly 420 (FIG. 2) is similar to the positive gear transmission mechanism 330, except that each ordinal gear train is comprised of only two gears 425 and 426, the assembly being pivoted on a shaft (not shown) parallel to, and spaced from, shaft 423 for rocking movement from the normally inoperative position shown to an operative position, whereby gears 426 are meshed with accumulator drive gears 411. Immediately prior to the return of bail 192 to the normal position shown in FIG. 3, either gears 340 or gears 426 are rocked into mesh with accumulator drive gears 411, as determined by the control key depressed. Thereafter, the bail 192 is rocked clockwise to return the differentially set actuator sectors 188 to their normally inactive position and the represented value is transferred positively or negatively into the accumulator 390.

Upon depression of the TOTAL key, a positive or negative total may be taken out of the accumulator 390 in a somewhat similar manner to the entry of the value therein. If the total in the accumulator 390 is positive, a depression of the TOTAL key effects engagement of gears 340 of the positive gear transmission mechanism with gears 411 associated with the accumulator and, conversely, if the total in the accumulator 390 is negative, the depression of the TOTAL key effects engagement of gears 426 of the negative gear transmission 420 with gears 411. Following the engagement of either gears 340 or 426 with gears 411, bail 192 is rocked counter-clockwise, as viewed in FIG. 3, and the actuator sectors 188 are thereby rocked counter-clockwise to return those accumulator gears 406 which have been rotated to a value representative position to a "0" stop position, whereupon, each of the corresponding sectors 188 will be differentially set to represent the digits of the value in the accumulator 390. During the time interval delay when bail 192 is in its extreme, counter-clockwise position, the actively engaged gears 340 or 426 are rocked to their normally inoperative position and bail 192 and the differentially adjusted sectors 188 are restored to the normal position shown in FIG. 3. After the actuator sectors 188 have been differentially adjusted and before the return of bail 192 to its normally inactive position, sectors 188 condition electrical readout switch 400 for subsequent operaton (FIG. 3), as will now be described.

*Electrical readout switch*

Each of the actuator sectors 188 is mechanically connected to the electrical readout switch 4000 (FIGS. 1 and 3) which is included in an electrical control system operable to control the operation of tape perforator 2 to perforate a tape in accordance with a predetermined code.

The readout switch 4000 comprises two contact plates 4001 and 4002 (FIG. 3) and sets of ordinal wiper contacts 4003 and 4004 formed at either end of conducting portions 4006. Contact plate 4001 is supported on the web portion of channel member 4197 between the flanges thereof. Similar spaced-apart arms 4195 are formed at right angles to the web portion of channel member 4197 and are secured on frame plates in the machine, one plate 4120 of which may be seen in FIG. 3. Contact plate 4002 is supported on the intermediate portion of a U-shaped bracket 4117, the similar upright arms 4118 of which are provided at their extremities with similar rollers 4200 engaged in elongated slots in the frame plates of the machine similar to the slot 4202 in frame plate 4120. Each arm 4118 of U-shaped member 4117 is also provided with a roller 4123 adjacent the lower end thereof, engaged in similar slots 4127 of the respective frame plates of the machine. Each of the slots 4202 and 4127 serve to guide U-shaped member 4117 and therefore contact plate 4002 in its up-and-down movement under the control of conventional means (not shown) and to maintain a parallel relationship between contact plate 4001 and plate 4002.

A set of wiper contacts 4003 and 4004 is provided for each order of the selection mechanism with an additional set for a tens-transfer which may be effected by the tenth or highest order selection segment 33 into the accumulator 390. The ordinal spacing of each set of wiper contacts 4003 and 4004 is identical to that of the actuator sectors 188. The wiper contacts 4003 and 4004 are integral and have an electrical connection through conducting portion 4006 having a pin-and-slot connection 4022 and 4023 with insulating member 4007. Insulating member 4007 is secured by a suitable means on carrage 4008 which is supported for reciprocatory movement on link block 4009. Each link block 4009 is supported at its ends in respective flanges of channel member 4197 in ordinally spaced relation to sectors 188. Each carriage 4008, together with the insulating member 4007 and the wiper contacts associated therewith, may be moved along the corresponding link block 4009 by operation of the associated connecting rod 4024, one end of which is pivotally secured to the corresponding actuator sector 188. Adjacent its other end, connecting rod 4024 carries a shoulder stud 4025 engaged in the slot in link block 4009, the arrangement being such that when the connecting rod 4024 is moved toward the right, as seen in FIG. 3, the carriage 4008 is also moved to the right to carry the wiper contacts 4003 and 4004 associated therewith in a straight line movement in the space between the supporting plates 4001 and 4002. The right-hand end portion of each of the connecting rods 4024 terminates in an upwardly directed nose 4027 normally positioned behind the insulated toothed member 4028 secured on electrical conductor member 4006. Normally, therefore, each carriage 4008 is cooperatively latched to the corresponding connecting rod 4024, as seen in FIG. 3. Wiper contact 4003, associated with each carriage, is provided at its extremity with a contact point 4005, while wiper contact 4004 is provided with two such contact points 4093, which are resiliently maintained in engagement with lower contact plate 4002 by compression spring 4094. Upon upward movement of lower contact plate 4002 by conventional means (not shown), wiper contacts 4003 and 4004 complete a circuit between upper contact plate 4001 and lower contact plate 4002.

Referring to FIG. 3, the contact plate 4001 is of insulating material supporting parallel spaced conducting strips 4030, 4031, 4032, 4033, 4034, 4035, 4036, 4037, 4038 and 4039 on one face thereof, the strips 4030 to 4039, inclusive, extending transversely of the readout switch assembly and being spaced-apart sufficiently to completely insulate one strip from the adjacent strip. At one extremity, each of the conducting strips 4030 to 4039, inclusive, is provided with a tubular terminal 4040 to 4049, inclusive, into which pin-type terminals on conductor wires (not shown) may be selectively connected as required.

Figure 8:
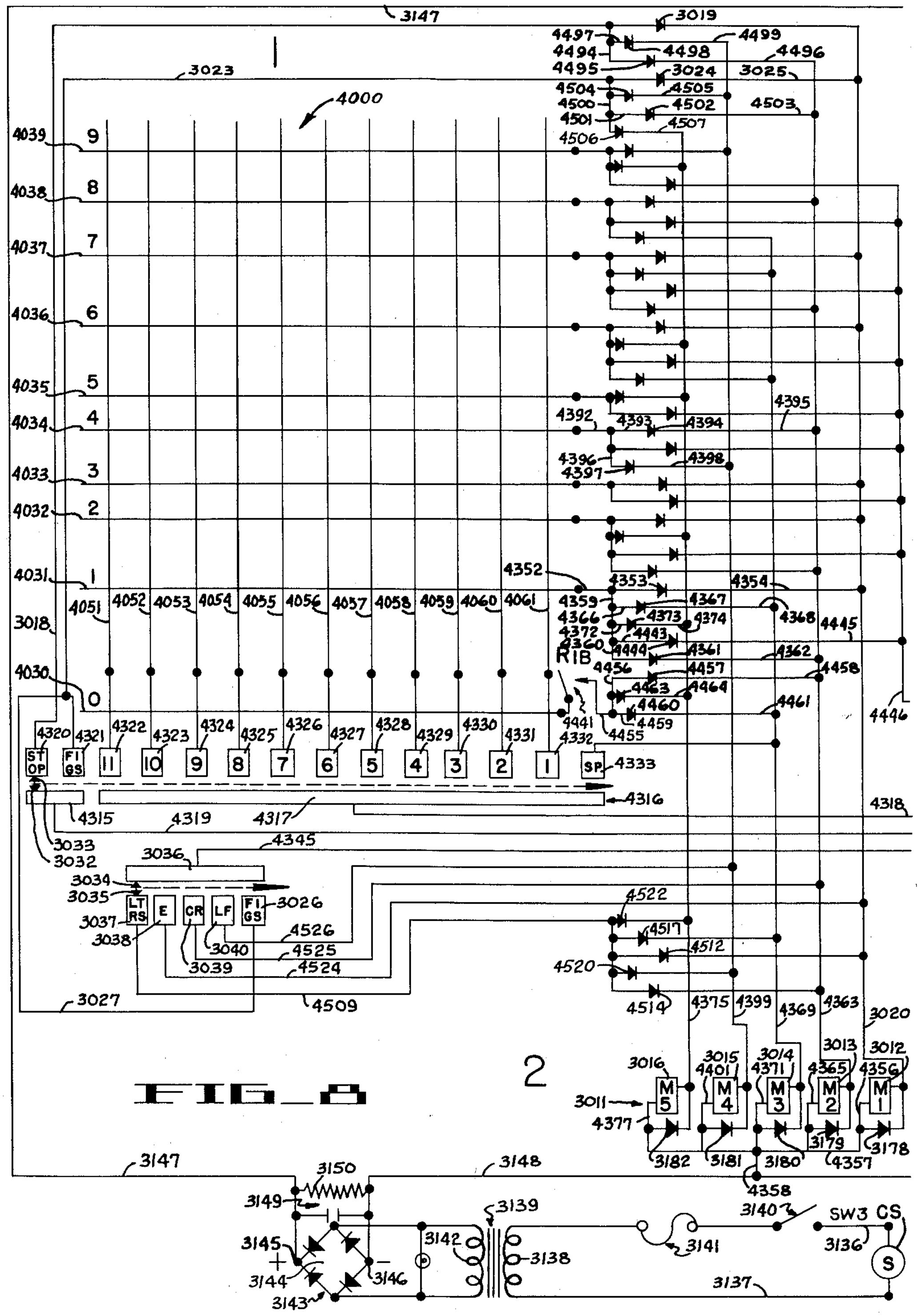
FIG. 8 is a circuit diagram of the readout switch provided in the computing apparatus, commutator type switches provided in the electrical system and electromagnetic devices operable to control the operation of perforating pins provided in the tape perforator.

The contact plate 4002 is constructed of an insulating material similarly to plate 4001 and supports on the one face thereof conducting strips 4051, 4052, 4053, 4054, 4055, 4056, 4057, 4058, 4059, 4060 and 4061 (FIGS. 3 and 8). The strips 4051 to 4061, inclusive, shown schematically in FIG. 8, have a parallel relationship and an ordinal spacing identical to that of actuator sectors 188 and extend longitudinally of contact plate 4002 at 90° to the transverse conductor strips on contact plate 4001. At its one end, each conductor strip 4051 to 4061, inclusive, is provided with a tubular terminal effective to selectively receive the pin-type terminals of conductor wires (not shown) as required for the distribution of current to various parts of the electrical control system.

From the foregoing description of the readout switch 4000, it will be understood that the counter-clockwise rotation of each sector 188 to a differentially adjusted position will likewise position the corresponding wiper contacts 4003 and 4004 on the associated carriage 4008 representative of the digit registered in the corresponding selection segment 33 or in the accumulator 390. Immediately following the differential adjustment of each sector 188, lower contact plate 4002 and therefore electrical conductor elements 4006 are moved upwardly, compressing springs 4094 and moving contact points 4005 on wiper contacts 4003 into engagement with selected ones of the conductor strips 4030 to 4039, inclusive, on plate 4001 in accordance with the differential setting of the corresponding actuator sectors 188, the strips 4030 to 4039, inclusive, representing the digits "0," "1," "2," etc., to "9," respectively. Normally, contact points 4005 on the wiper contacts 4003 are not in contact with selected ones of the strips on contact plate 4001 but become effective upon upward movement of plate 4002 to complete the circuit between plates 4001 and 4002. As plate 4002 and electrical conductor elements 4006 are moved upwardly following the differential adjustment of carriages 4008, the tooth 4028 on each of the conductor elements 4006, associated with the adjusted carriages 4008, is moved out of engagement with the nose 4027 on the corresponding connecting rod 4024, thereby enabling return of the adjusted sectors 188 to the inactive position shown in FIG. 3 and permitting the adjusted carriages 4008 to remain in their set positions. Thus, it can be seen, that the electrical connections which have been made by way of the ordinal contacts 4003 and 4004 of the readout switch 4000, are in accordance with amounts registered in the accumulator 390.

Near the end of the machine operation, the cam means (not shown), which operate in a well-known manner to raise contact plate 4002, become effective to release the plate 4002 for return to the inactive position shown in FIG. 3. During the lowering of the plate 4002, springs 4094 also restore the electrical conductors to their nonconductive position. Immediately following the return of contact plate 4002 to its normally inoperative position, conventional means are brought into play to restore each of the differentially set carriages 4008 to their normally latched positions with respect to the teeth 4027 on connecting rods 4024. For this purpose, two similar bow-shaped arms 4150 are secured on shaft 4152 (FIG. 3) supported at its ends for rocking movement in similar brackets 4154 secured in the framework of the machine. Each arm 4150 extends rearwardly and upwardly on either side of readout switch 4000 and is provided at its upper end with an elongated slot 4168. Rod 4165 extends transversely of readout switch 4000 through longitudinal slots 4172 in link blocks 4009 and at its ends, which are of a reduced diameter, is supported in elongated slots 4168 in arms 4150. Thus, it can be seen, that immediately following the return of lower contact plate 4002 to its normal position and, upon counterclockwise rocking movement of shaft 4152, rod 4165 is moved to the left, as viewed in FIG. 3, to restore the carriages 4008 from their delatched differentially set position. As the carriages 4008 are moved into the position shown in FIG. 3, nose 4028 on electrical conductors 4006 engages nose 4027 on the corresponding connecting rod 4024 and is cammed upwardly against the urgency of the associated spring 4094 which becomes effective, upon further leftward movement of the carriages 4008, to relatch the carriages with the corresponding connecting rods 4024. Immediately following the return of the carriages 4008 to their latched position, shaft 4152 is rocked clockwise to restore rod 4165 to the normal position shown in FIG. 3.

*Tape perforator*

Figure 4:
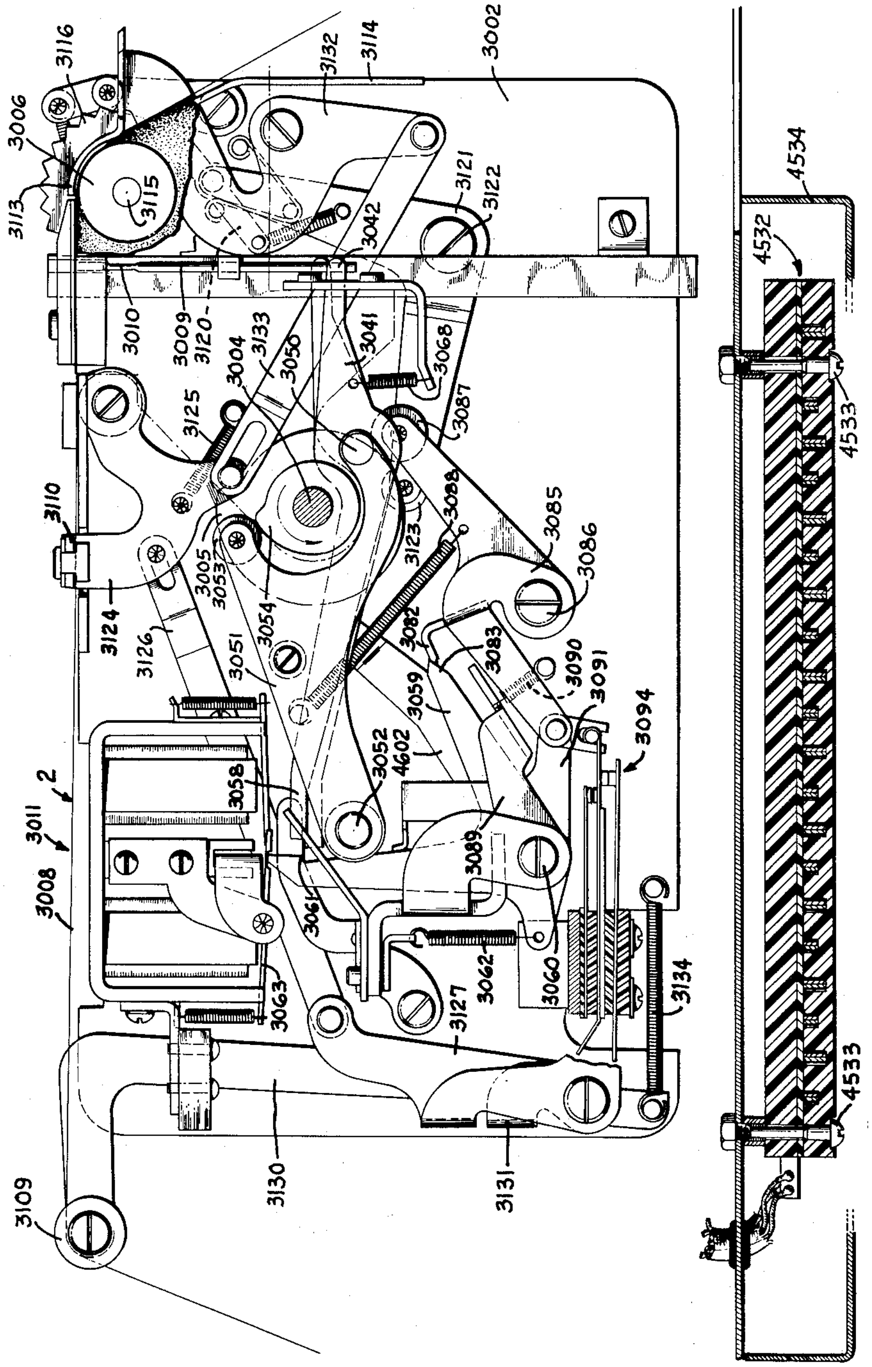
FIG. 4 is an elevational view of the tape-punch mechanism as viewed from the left in FIG. 1.

For the purpose of illustrating the invention and not in the sense of a limitation thereof, the record-making machine is shown and described herein as a conventional tape perforator, generally indicated at 2 in FIGS. 1 and 4, operable to make a five-channel perforated tape record representative of amounts entered and accumulated in the computing apparatus 1 and electrically represented in the readout switch 4000 contained therein.

The tape perforator 2 may be supported on, or separated from, the base of the computing apparatus 1. Tape perforator 2 comprises a side frame member 3002 supporting a laterally extended bearing 3003 forming the main support for the operating shaft 3004 carrying a plurality of cams, one of which cams (not shown) controls the operation of the tape feed wheel 3006. The tape 3008 feeds through the tape perforator 2 from a source of supply (not shown) passing from the left end of the apparatus (FIG. 4) to the right emerging from the right end in a perforated form in accordance with a suitable code such, for example, as the Baudot or the telegraph codes commonly employed in making perforated records such as can be subsequently used to control a printing machine operable to make printed records of information stored in perforated tapes.

The perforations are made in tape 3008 by operation of a set of punches 3009 which, as seen in FIG. 4, may be selectively thrust upwardly from the position shown so that the upper reduced diameter end 3010 of the punch may be forced to penetrate the tape 3008. The tape perforator shown in the drawings is of a type in which nine punches may be employed, the punches being arranged in a row so that nine perforations may be made in a row extending transversely of the tape. In an actual setup of the tape perforator for use in connection with the above-mentioned adding machine, only six punches are required, one of the punches being operable to make a series of equally spaced feed holes in the tape extending along the length of the tape, while the other punches are selectively operable to make code perforations in the tape, the locations and arrangements of the perforations being representative of information it is required to store. The selective operation of the punches is accomplished by electromagnetic means in accordance with the settings of movable contacts in a switch means, the movable contacts being under the control of the computing apparatus.

The code is arranged to represent values and numbers from "0" to "9," inclusive, to represent letters of the alphabet CR (carriage return), LF (line feed), FIGS, STOP, and SPACE signals. As viewed in FIG. 1, perforations in the first and second positions, reading from the left side of the tape, are followed by a tape feed hole position, while the third, fourth and fifth positions are used in combination with the first and second positions to indicate the value represented by the arrangement and relative positions of the perforations. The selective operation of each of the punches 3009 is under the control of the set of electromagnetic devices indicated generally at 3011.

The operating mechanism for each of the punch rods 3009 under the control of a corresponding one of a set of electromagnetic devices 3011 are similar in structure. It is believed, therefore, that a description of the control mechanism for one such punch rod will suffice for all. Each punch pin, or rod, 3009 is provided with an operating lever 3041 (FIG. 4), which has a pivotal relationship at 3042 with the lower end of pin 3009. Each of the operating levers 3041 is pivotally supported on rod 3050, which is supported at its ends in two spaced-apart cam follower arms 3051, pivotally supported on stub shaft 3052 extending from, and carried by, side frame member 3002. Each of arms 3051 is provided with a roller 3053, urged by springs 3068, one for each of levers 3041, into engagement with the peripheral edge of a corresponding one of similar cams 3054 secured on shaft 3004. The left end 3058 of lever 3041 is normally free to be moved upwardly by arms 3051 upon rotation of cams 3054, thereby imparting no movement to the associated punch pin 3009. However, the free end 3058 may be selectively held against upward movement by means of the corresponding one of a series of bellcrank levers 3059, mounted for rocking movement on shaft 3060 secured in the framework of the perforator 2. The vertically extended arm of each bellcrank 3059 is provided with a shoulder 3061 adjacent its upper end operable to engage over the end 3058 of the corresponding lever 3041 under the influence of the associated spring 3062. Normally, each bellcrank 3059 is retained in its inactive position by the engagement of the extremity of the upwardly extending arm of the bellcrank in a notch in armature 3063 of the associated electromagnet of the devices 3011. When a selected one of the electromagnetic devices 3011 is energized, the armature 3063 is moved away from the upper end portion of the associated bellcrank 3059 to release the bellcrank to the influence of its spring 3062. The shoulder 3061 of the released bellcrank 3059 is moved over the left end of the associated lever 3041 to serve as a fulcrum for the lever so that, upon rotation of cams 3054, the rightward end of lever 3041 is moved upwardly to force the corresponding punch pin 3009 through the paper tape 3008. The perforator pins associated with operating levers not held against upward movement at their left ends 3058 will not perforate the paper tape 3008 when follower arms 3051 are rocked by the cams 3054. Springs 3068 not only serve to maintain rollers 3053 in engagement with the associated cams 3054, but also assure the return of punch pins 3009 to their inoperative position. The left end of the operating lever associated with the punch pin 3009, utilized to punch the feed holes in tape 3008, is permanently held against upward movement so that with each operation or rotation of cams 3054, a feed hole is punched in the tape.

The bellcrank levers 3059, selectively unlatched by operation of the electromagnetic devices 3011, are subsequently latched in their spring-urged operated position by a gang latch 3082 which extends across, and normally out of, the path of movement of pointed end portion 3083 of the levers 3059. The latch 3082 extends from lever 3085, pivotally supported at 3086, and having a cam follower roller 3087 in engagement with cam 3005 cyclically operated in each rotation of shaft 3004 to move lever 3085 against the urgency of spring 3088. As seen in FIG. 4, rollers 3053 of arms 3051 are riding on the high point of cams 3054 and pilot hole punch pin 3009 has been moved to its raised position since the leftmost end of the associated lever 3041 is permanently latched against movement. It will be noted also, that gang latch 3082 is in blocking position relative to bellcranks 3059, and the free end 3058 of the code punch levers 3041 are in their raised position since bellcranks 3059 associated therewith have not been released to operated position. In the full-cycle position of cams 3054, i.e., approximately 180° from the position shown, the leftmost ends of levers 3041 will be in their lower position for engagement by the shoulder 3061 of the corresponding bellcrank latches 3059 upon release selectively by electromagnetic devices 3011. With this angular displacement of shaft 3004 and cams 3054 from the position shown to the full-cycle position thereof, gang latch 3082 is moved clockwise under control of cam 3005 out of engagement with bellcranks 3059. Almost immediately upon initiation of each cycle of operation of tape perforator 2, latch 3082 is released to the urgency of spring 3088 for engagement with the bellcrank levers 3059 which have been selectively released by the electromagnetic devices 3011. The contour of the cam 3005 is such that immediately following the operation of the selected punch pins 3009, gang latch 3082 is rocked out of engagement with levers 3059 and remains disengaged to the end of the cycle.

The actively positioned bellcranks 3059 are restored to their normally inactive position by means of bail 3089 pivotally mounted for rocking movement on shaft 3060. Bail 3089 extends transversely of, and in engagement with, the lower edge of the angularly disposed arms of the actively positioned bellcranks 3059. The arm 4602 of bail 3089 carries a roller at its upper end engaging the peripheral surface of a cam (not shown) on shaft 3004. Immediately following the operation of the selected punch pins 3009 and the removal of gang latch 3082 from its engagement with bellcranks 3059, bail 3089 is rocked, counter-clockwise from the position shown in FIG. 4, against the urgency of spring 3090 to restore the actively positioned bellcranks 3059 to their latched inactive position. Following the restoration of the bellcranks 3059 to their inactive position, the bail 3089 is promptly returned to the position shown in FIG. 4.

Figure 7:
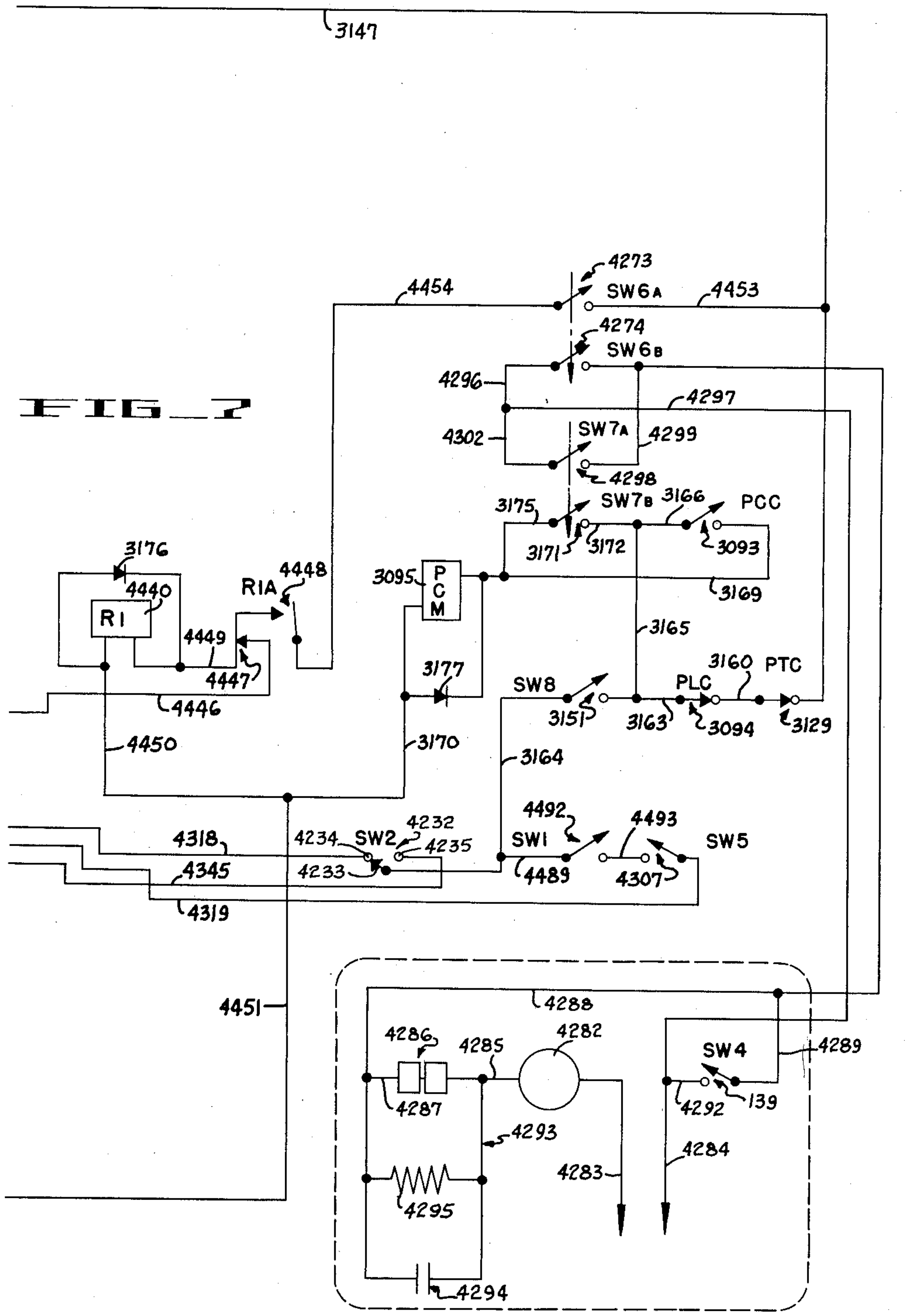
FIG. 7 shows the power supply for the motor of the computing apparatus and also shows the electrical switching ssytem provided in the computing apparatus and operable to control the operation of the electrical readout means and the tape perforating members in accordance with the operationn of control keys in the computing apparatus.

A bail 3091 pivotally supported on shaft 3060 extends across the path of clockwise movement of bellcrank levers 3059 and becomes effective, when any of the electromagnetic devices 3011 is operated, to close a normally open switch 3093 (PCC) shown in FIG. 7. The switch 3093 is not shown in FIG. 4 but is located directly behind normally closed switch 3094 (PLC) which opens in midcycle under control of gang latch 3082 to release the clutch magnet 3095 (PCM) (FIG. 1) from energization.

Clutch magnet 3095 (FIG. 1) is supported on bracket 3096 secured on side frame member 3002 and is operable to control the operation of clutch 3097 to effect operation of tape perforator 2. Clutch 3097 serves, upon engagement thereof, to connect motor-driven pulley 3098 with tape perforator shaft 3004, pulley 3098 being driven by means of a belt extending from pulley 3100 on motor-driven shaft 4 of the computing apparatus 1.

Referring to FIG. 4, tape 3008 is fed over roller 3109, under guide member 3110, between print blocks associated with punch pins 3009, over tape feed wheel 3006 between the wheel and curved guide plate 3113, and outwardly of the apparatus over bracket 3114 secured on the tape perforator frame. The tape 3008 is fed along in step-by-step fashion under the control of tape feed wheel 3006 secured to shaft 3115, which also carries detent ratchet 3116. The step-by-step rotation of ratchet 3116 and therefore tape feed wheel 3006 is under the control of yieldable pawl 3120 pivotally mounted on the end of one arm of bellcrank 3121 pivoted at 3122 on frame member 3002. Roller 3123 on the end of the other arm of bellcrank 3121 is in engagement with a cam (not shown) secured on shaft 3004, the configuration of the cam being such, that for each cyclic operation of shaft 3004, bellcrank 3121 is oscillated once immediately following the operation of punch pins 3009. If the tape 3008 should break during the operation of the apparatus, lever 3124 pivoted on frame member 3002 and supporting tape guide 3110 will be rocked counter-clockwise under the urgency of spring 3125 which normally serves to apply a limited tension on tape 3008. As lever 3124 is rocked, link 3126, pivotally connected thereto, is pulled to the right and imparts clockwise rotation to bellcrank 3127, the substantially horizontal arm of which (broken away in FIG. 4) serves to open a normally closed switch 3129 (PTC) (FIG. 7) to stop operation of the tape perforator until the tape is again made taut under the guide 3110.

Undue tightening of the tape 3008 in its span from its source of supply to the tape feed wheel 3006 will also serve to cause opening of switch 3129. Roller 3109, over which the tape passes, is supported on the upwardly offset end of pivotally mounted lever 3130 (FIG. 4) which is provided with an ear 3131 overlying one arm of bellcrank 3127. Thus, when the tape 3008 is tightened sufficiently, lever 3130 is rocked clockwise against the urgency of spring 3134 imparting clockwise rotation to bellcrank 3127.

To facilitate insertion of the tape 3008 between the guide 3113 and feed wheel 3006, guide 3113 is rocked outwardly in a clockwise direction away from feed wheel 3006. Lever 3132, pivotally mounted on frame member 3002, carries guide 3113 formed at a right angle to the upper end thereof. At its lower end, lever 3132 is pivotally connected to one end of link 3133 having a pin-and-slot connection at its other end with lever 3124. As the guide 3113 is moved fully outwardly from the feed wheel 3006, link 3133 rocks lever 3124 in a clockwise direction beyond dead center sufficient to pull lever 3126 to the right, thereby operating bellcrank 3127 to open the switch 3129.

*Commutator switch*

Figure 5:
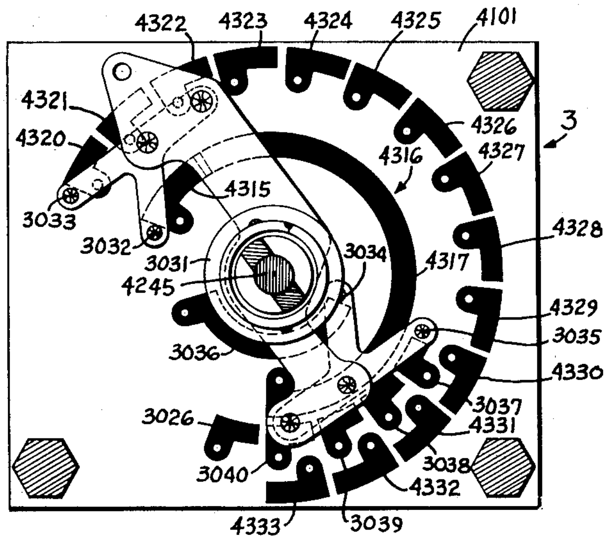
FIG. 5 is a sectional elevational view of the commutator type switch.

As described supra, the selective operation of the punch pins 3009 is accomplished by means of electromagnetic devices 3011 provided to selectively control the effectiveness or ineffectiveness of levers 3041 in mechanical connection with the punches. A commutator switch 3 is employed as a means for controlling the operations of the electromagnetic devices 3011 in tape perforator 2 when the electromagnetic devices are to be operated to control the punches to make coded perforations in the tape representing directional and operational signals to be given a machine operating under control of the tape. The electromagnetic devices 3011 are controlled by commutator switch 3 (FIG. 5) in accordance with the differential adjustment of movable carriages 4008 in readout switch 4000, the position of the carriages 4008 representing a value registered in the computing apparatus. The rotary commutator switch 3 also functions to control the operation of tape perforator 2 to punch designations representing LTRS, E, CR, LF, FIGS, STOP and SPACE, as required.

Rotary commutator switch 3 (FIG. 5) comprises insulating panel 4101 supporting collector ring 3036 and segmental contacts 3037, 3038, 3039, 3040 and 3026. Also mounted on panel 4101 is collector ring 4316 divided into two sections, 4315 and 4317. A series of segmental contacts 4320, 4321, 4322, 4323, 4324, 4325, 4326, 4327, 4328, 4329, 4330, 4331, 4332 and 4333 are likewise secured on panel 4101 for cooperation with collector ring 4316. Insulating support arm 3031 is secured on shaft 4245 journalled at its one end in panel 4101 and, at its other end and intermediate its ends, in the framework of the machine. At its one end, arm 3031 supports a pair of wiper contacts 3032 and 3033, and at its other end carries a similar set of wiper contacts 3034 and 3035 operable, respectively, to complete the circuit between collector ring 4316 and each of contacts 4320 to 4333, inclusive, and between collector ring 3036 and each of contacts 3037 to 3040, inclusive, and contact 3026. As explained, the switch 3 serves as a commutator for the readout switch 4000. The segmental contacts 4322 to 4332, inclusive, are separately connected electrically to conductor strips 4051 to 4061, inclusive, of the readout switch 4000 and operable to provide a means for selectively controlling the operation of the set of electromagnetic devices 3011. The segmental contact 4320 of the switch 3 represents the STOP position, while the segmental contact 4321 represents the designation FIGS in the apparatus. The control of the tape perforator 2 for the designation SPACE is represented by segmental contact 4333.

The cyclic rotation of contacts 3034 and 3035 operates to electrically connect collector ring 3036 selectively with segmental contacts 3037 to 3040, inclusive, and contact 3026. Segmental contact 3037 selectively controls the tape perforator 2 for a code signal on the tape representative of LTRS. The control of the tape perforator to code the letter "E" is determined by segmental contact 3038. A signal indicating "carriage return" (CR) will be coded on the tape through segmental contact 3039. The coded signal for "line feed" (LF) is under the control of segmental contact 3040. Upon utilization of segmental contact 3026, the resulting signal will indicate that the perforations subsequently made in the tape are to be interpreted as representing numerical values. The commutator switch 3 may be brought into, or out of control, with respect to the electromagnetic devices 3011 by operation of the VOID key switch 4232 (SW2).

Figure 6:
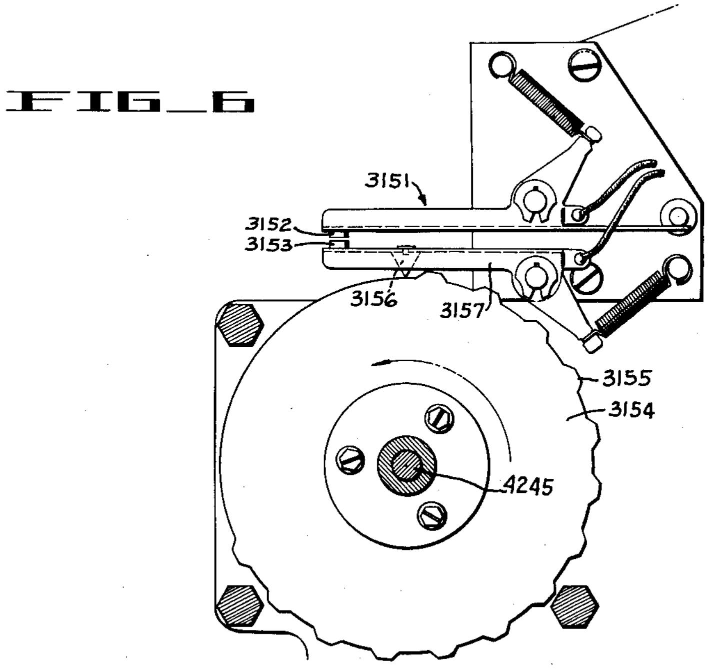
FIG. 6 is a sectional elevational view of the cam-operated switch operable to complete circuit connections at required predetermined intervals.

The system is provided with pulsing switch 3151 (SW8) comprising, as shown in FIG. 6, a pair of normally open contacts 3152 and 3153 whcih are closed intermittently under the control of toothed wheel 3154 secured on shaft 4245 adjacent commutator switch 3 for synchronous rotation therewith. Tht teeth 3155 are spaced-apart on the periphery of wheel 3154 equal to the center-to-center spacing of each adjacent pair of contacts 4320 to 4333, inclusive, and are operable to engage tapered pin 3156 mounted on spring-biased arm 3157 bearing contact 3153, thereby closing pulsing switch 3151.

*Electrical system*

The functional keys of the adding machine, such as the PLUS key, MINUS key, CLEAR KEYBOARD key, TOTAL key, and PRINT ONLY key, are all operable to control the application of power to the adding machine by virtue of link 169 (FIG. 1) which is moved forwardly to close switch 139 (SW4), shown in FIG. 7. The source of current supply (not shown) may be any suitable supply such, for example, as an alternating current of about 115 volts being supplied through conductors 4283 and 4284 (FIG. 7). Upon closure of switch 139, current is supplied to motor 4282 through conductor 4283 to the motor, conductor 4285, centrifugally operated speed governor 4286, conductor 4287, conductor 4288, conductor 4289, closed switch 139 and conductor 4292 to the source of supply conductor 4284. A spark-arresting circuit 4293 is provided around the contacts in the speed governor switch 4286 and involves condenser 4294 and resistance 4295.

The initial operation of motor 4282, each time a functional key is depressed, is effective to enable operation of the computing apparatus 1. Upon depression of the PRINT ONLY key or TOTAL key and after the initial energization of motor 4282 over the above-described circuit, motor 4282 is subsequently energized over a second circuit to effect a readout operation under control of readout switch 4000. The second circuit involves switches 4273 and 4274 (FIG. 7), which are the SW6A and the SW6B off-normal contact switches, selectively closed by mechanism (not shown) under the control of actuator shaft 185, upon counter-clockwise rocking movement thereof, as fully disclosed in the afore-mentioned Patent No. 2,861,739. This circuit may be traced from conductor 4283 to motor 4282, conductor 4285, through governor switch 4286, conductors 4287 and 4288, switch 4274 (SW6B), conductors 4296, 4297, and 4284 to source of current supply.

When it is desired to visually read the code signals on the tape or to remove perforated portions of the tape from the apparatus, a third motor supply circuit is provided for control by switch 4298, which is combined with switch 3171. The switches 4298 and 3171 are the SW7A and SW7B off-normal contact switches which are manually operated by a tape feed key (FIG. 1) and become effective, upon depression of the tape feed key, to energize the motor and the punch clutch magnet 3095. The operation of the tape perforator 2 is thereafter effective to run tape through the apparatus without recording code signals thereon. The third motor circuit may be traced through conductor 4283 from the source of current supply to motor 4282, conductor 4285, speed governor switch 4286, conductors 4287, 4288, and 4299, switch 4298 (SW7A), conductors 4302, 4297, and 4284 to source of current supply.

*Electrical system*

As hereinbefore mentioned, the motor 4282 of the computing apparatus may be operated from a suitable source of current supply such, for example, as an A.C. source delivered at approximately 115 volts. The readout switch 4000 in the computing apparatus 1 and the electromagnetic devices 3011 in the tape perforator apparatus 2 are, however, constructed and arranged for operation on a D.C. system. To obtain the direct current supply for the electrical system, the conductors 3136 and 3137 (FIG. 8) leading from a suitable source of alternating current supply, may include the primary winding 3138 of an alternating current transformer 3139 and, in this primary circuit, there may be a cover interlock switch 3140 (SW3) and a protective fuse 3141. The cover interlock switch 3140 (SW3) is operable to close its contacts when the cover of the apparatus is applied and will open its contacts when the cover is removed. The transformer 3139, through its secondary winding 3142, supplies alternating current at the desired voltage to a full-wave rectifier 3143. The rectifier 3143 may be a suitable set of selenium rectifiers arranged in a bridge 3144, the conjugate arms 3145 and 3146 of which are connected to conductors 3147 and 3148, which form the main conductors of the switching system. The conductors 3147 and 3148 are provided with the usual condenser 3149 and resistor 3150 in shunt of the bridge 3144.

Subsequent to the operation of the digital keys 17 and the "0" key (FIG. 1) for the entry of a value into the selection mechanism of the computing apparatus 1, operation of the PLUS or MINUS key, the TOTAL key, KEYBOARD CLEAR key, VOID key, and PRINT ONLY key will, as explained above, result in closing switch 139 (SW4) to energize motor 4282 for one complete cyclic operation of the computing apparatus.

In addition to effecting energization of the motor 4282, a depression of the VOID key, the PRINT ONLY key, and the TOTAL key also serves to operate other switches to control various operations of the machine. A depression of the VOID key operates, not only to close switch 4274 (SW6B) to energize the motor, but also to close switch 4273 (SW6A) and to operate switch 4232 (SW2) which is, in effect, a single pole double throw switch. Closure of switch 4232 (SW2) is effective to enable the operation of the electromagnetic means in the tape perforator 2 under control of segmental contacts 3037, 3038, 3039 and 3040 in rotary commutator switch 3. Switch 4232 (SW2) comprises central spring contact 4233 normally biased to engage the left-hand contact 4234 which, upon depression of the VOID key, is moved away from contact 4234 and into engagement with the right-hand contact 4235. The PRINT ONLY key, upon depression, serves, not only to close switch 139 to energize the motor, but also closes switch 4307 (SW5) to cause the apparatus to print and record each value entered into the accumulator. A depression of the TOTAL key functions to close normally open switch 4492 (SW1) in addition to closure of motor switch 139. Each of the latter mentioned keys is operable to effect closure of switch 4273 (SW6A) near the end of the cyclic operation of the computing apparatus 1.

Assuming that the readout switch 4000 is to be utilized to control the operation of tape perforator 2, and also assuming that the tape is properly positioned in the tape perforator to close switch 3129 (PTC), a depression of any one of the above-mentioned three control keys will operate to energize the motor and effect operation of the electromagnets in the tape perforator 2 to code representations in the readout switch 4000. The operation of the electromagnets 3011 may be traced over the following circuits: conductor 3147 (FIGS. 7 and 8) through closed switch 3129 (PTC), conductor 3160 through closed switch 3094 (PLC), conductor 3163 through closed switch 3151 (SW8), conductor 3164, contacts 4233 and 4234 of switch 4232 (SW2), and conductor 4318 to collector ring 4316 of commutator switch 3. Assuming a value "111" is represented in readout switch 4000, the circuits may be traced out of the readout switch as follows: For the hundredths order position, the circuit would be closed from collector ring 4316 through wiper contacts 3032 and 3033 to segmental contact 4330 of commutator switch 3, conductor strip 4059, wiper contacts 4004 and 4003 of switch 4000, conductor strip 4031, conductor 4352, diode 4353, conductor 4354, conductor 3020 to electromagnet 3012 of devices 3011, conductors 4356, 4357, 4358, and 3148 to rectifier 3143 for the first position hole in the tape. For the second position hole, the circuit would extend from conductor 4352 to conductor 4359, conductor 4360, diode 4361, conductors 4362 and 4363, to electromagnet 3013 of the devices 3011, conductors 4365, 4357, 4358 and 3148 to rectifier 3143. To punch the third position hole, the circuit would extend from conductor 4352 to conductors 4359 and 4366, diode 4367, conductors 4368 and 4369 to electromagnet 3014, conductors 4371, 4358 and 3148 to rectifier 3143. For the fifth position hole in the tape, the circuit extends from conductor 4352 to conductors 4359 and 4372, diode 4373, conductors 4374 and 4375 to electromagnet 3016 of the electromagnetic devices 3011, conductors 4377, 4357, 4358 and 3148 to rectifier 3143. The tape perforator now becomes effective to code the "1" in the tens order position of the value on the tape 3008.

For the "1" in the tens order of the number "111," the electromagnetic devices 3012, 3013, 3014 and 3016 must again be operated in the order mentioned, and it will be seen that this will occur when the wiper contact 3033 of the commutator switch 3 reaches the segmental contact 4331 and the wiper contacts 4004 and 4003 are in contact with conductor strips 4060 and 4031, respectively, of the readout switch 4000. Similarly, for the "1" in the units order of the value "111," the electromagnetic devices 3012, 3013, 3014, and 3016 must again be operated in the order mentioned, and it will be seen that this will occur when the wiper contact 3033 of the commutator switch 3 reaches the segmental contact 4332 and the wiper contacts 4004 and 4003 are on the respective conductor strips 4061 and 4031 of the readout switch 4000. Each of the electromagnets utilized to code the tens digit and units digit of the value "111" is energized from conductor 4352 through each of the circuits described for the hundredths order digit of the value.

Assuming that the value "4111" is in the computing apparatus with the digit "4" in the thousandths order, the wiper contacts 4004 and 4003 for the fourth ordinal position in readout switch 4000 would be in position at the crossover points of the conductor strips 4058 and 4034. Under this condition, the electromagnets 3013 and 3015 of the devices 3011 will be energized to cause their associated pins to make a code perforation in the tape at the second and fourth positions across the tape, the electromagnetic devices being energized over circuits that may be traced from the commutating switch 3 as follows: For the electromagnet 3013, the circuit extends from wiper contact 3033, segmental contact 4329, conductor strip 4058, wiper contacts 4004 and 4003 of readout switch 4000, conductor strip 4034, conductors 4392 and 4393, diode 4394, conductors 4395 and 4363, electromagnet 3013, conductors 4365, 4357, 4358 and 3148 to bridge 3144.

For the electromagnet 3015, the circuit extends from wiper contact 3033, segmental contact 4329, conductor strip 4058, wiper contacts 4004 and 4003 of readout switch 4000, conductor strip 4034, conductors 4392 and 4396, diode 4397, conductors 4398 and 4399 to electromagnet 3015, conductors 4401, 4357, 4358 and 3148 to the bridge 3144.

Thus, it becomes apparent that any value comprised of from one to ten digits may be recorded on tape 3008 by coded perforations therein, in accordance with a predetermined code such, for example, as that used for the "1's" and "4" of the values given above.

Records are made in the tape 3008 when "0" values in the computing apparatus are preceded by some digit from "1" to "9," inclusive. When the wiper contacts 4004 and 4003 of readout switch 4000 are in the fully retracted position, they will become effective to form an electrical connection between the conductor strips 4051 to 4061 and the conductor strip 4030. However, employing the code used in connection with the machine described supra, the electromagnets 3013, 3014 and 3016 will not effect operation of the tape perforator to record a "0" unless the "0" has been preceded by some digit from "1" to "9," inclusive.

In the event that the digit "0" is preceded by a "1," a relay 4440 (R1) (FIGS. 7 and 8) is operated to close contacts 4441 and to lock up through its contacts 4448 (R1A). The circuit for operation of relay 4440 (R1) may be traced from the positive side of bridge 3144 to conductor 3147, closed switch 3129 (PTC), conductor 3160, closed switch 3094 (PLC), conductor 3163, closed switch 3151 (SW8), conductor 3164, contacts 4233 and 4234 of switch 4232 (SW2), conductor 4318, collector ring 4316 of commutator switch 3, wiper contacts 3032, 3033, a selected one of the segmental contacts 4322 to 4332, inclusive, for example, segmental contact 4331 for the second ordinal position, conductor strip 4060, wiper contacts 4004 and 4003, conductor strip 4031, conductors 4352, 4359 and 4443, diode 4444, conductors 4445 and 4446, breaker contacts 4447 of make-before-break contacts 4448, conductor 4449 to relay 4440 (R1), conductors 4450, 4451 and 3148 to the negative side of bridge 3144.

The lockup circuit for the relay 4440 (R1) is formed when the relay is initially energized and closes contacts 4448 before contacts 4447 are opened. When the contacts 4448 are closed the relay 4440 (R1) remains energized over its lockup circuit, which may be traced from bridge 3144, conductors 3147 and 4453 through closed switch 4273 (SW6A), conductor 4454, contacts 4448, conductor 4449, relay 4440 (R1), conductors 4450, 4451 and 3148 to bridge 3144.

The closing of contacts 4441 (R1B) (FIGS. 7 and 8) by relay 4440 (R1) prepares a circuit for the operation of the electromagnets 3013, 3014 and 3016 to control the operation of the perforator pins to make a record on the tape representative of "0." If there should be a "0" in the units order, wiper contacts 4004 and 4003 will be in contact with conductor strip 4061 and 4030, respectively, and if contacts 4441 (R1B) are closed, the circuit for electromagnet 3013 may be traced from conductors 4455 and 4456, diode 4457, conductors 4458 and 4363 to electromagnet 3013, conductors 4365, 4357, 4358 and 3148 to bridge 3144.

The electromagnet 3014 is under the control of conductors 4455 and 4459, diode 4460, conductors 4461 and 4369 to electromagnet 3014, conductors 4371, 4358 and 3148 to the bridge 3144.

For the operation of the electromagnet 3016, the circuit extends from conductors 4455 and 4456, diode 4463, conductors 4464, 4375 to electromagnet 3016, conductors 4377, 4357, 4358 and 3148 to the bridge 3144.

Word records are made in the tape 3008 to indicate letters and words for directing the operations of a typewriter in transcribing the information recorded on the tape. By means of the code used in the machine described incorporating the present invention, the word "STOP" is recorded by perforations made in the tape through operation of perforator pins 3009 rendered effective by electromagnets 3012, 3013 and 3015 of the electromagnet devices 3011 under control of commutator switch 3.

A circuit for the electromagnet 3012 may be traced from bridge 3144, conductor 3147, closed switch 3129 (PTC), conductor 3160, closed switch 3094 (PLC), conductor 3163, switch 3151 (SW8), conductor 3164, conductor 4489, closed switch 4492 (SW1), conductor 4493, closed switch 4307 (SW5), conductor 4319, collector ring 4315, wiper contacts 3032, 3033, segmental contact 4320, conductor 3018, diode 3019 and conductor 3020 to electromagnet 3012, thence through conductor 3148 to bridge 3144.

The circuit for the electromagnet 3013 operated in the STOP code signal may be traced over conductors 3018 and 4494, diode 4495, conductors 4496 and 4363 to electromagnet 3013, thence over conductor 3148 to bridge 3144.

The circuit for controlling electromagnet 3015 in the recording of the "STOP" code signal may be traced over conductors 3018, 4494 and 4497, diode 4498, conductors 4499 and 4399 to electromagnet 3015, thence over conductor 3148 to bridge 3144.

The abbreviation "FIGS" is indicated by perforations made in the tape through operation of the perforator pins 3009 rendered effective by electromagnets 3012, 3013, 3015 and 3016 under control of commutator switch 3. The circuits used in recording "FIGS" on the tape may be traced as follows: For the electromagnet 3012, current passes from bridge 3144 over conductor 3147 through closed switch 3129 (PTC), conductor 3160, closed switch 3094 (PLC), conductor 3163, switch 3151 (SW8), conductors 3164 and 4489, closed switch 4492 (SW1), conductor 4493, switch 4307 (SW5), conductor 4319, collector ring 4315, wiper contacts 3032, 3033, segmental contact 4321, conductor 3023, diode 3024, conductors 3025 and 3020 to electromagnet 3012, thence by way of conductor 3148 to bridge 3144.

For the operation of electromagnet 3013 in the "FIGS" code signal pattern, the circuit may be traced over conductors 3023, 4500 and 4501, diode 4502, conductors 4503 and 4363 to electromagnet 3013, thence over conductor 3148 to bridge 3144.

The electromagnet 3015 is energized in the recording of the "FIGS" code signal over conductors 3023 and 4500, diode 4504, conductors 4505 and 4399 to electromagnet 3015 and over conductor 3148 to bridge 3144.

To complete the "FIGS" code signal, electromagnet 3016 is energized over conductors 3023 and 4500, diode 4506, conductors 4507 and 4375 to electromagnet 3016, thence over conductor 3148 to bridge 3144.

The "FIGS" code signal will also be recorded on the tape 3008 upon depression of the VOID key. This circuit may be traced from bridge 3144 over conductor 3147, closed switch 3129 (PTC), conductor 3160, switch 3094 (PLC), conductor 3163, closed switch 3151 (SW8), conductor 3164, movable contact 4233 and fixed contact 4235 of switch 4232 (SW2), conductor 4345, collector ring 3036, wiper contacts 3034, 3035, segmental contact 3026, conductors 3027 and 3023 to control the operation of the electromagnets 3012, 3013, 3015 and 3016, as described above.

Each of the code signals "E" 3038, "CR" 3039 and "LF" 3040 is selectively recorded on tape 3008 from collector ring 3036, wiper contacts 3034, 3035, over respective conductors 4524, 4525 or 4526 to effect operation of respective electromagnets 3012, 3013, or 3015. However, the code signal for "LTRS" 3037 is effected by operation of electromagnets 3012, 3013, 3014, 3015 and 3016, the circuit for which may be traced from collector ring 3036, wiper contacts 3034, 3035, conductor 4509, and respective diodes 4512, 4514, 4517, 4520 and 4522.

The punch clutch magnet 3095 (PCM) is rendered operable to permit power to be transmitted to the cam shaft 3004 of the tape perforator 2 when any one of the electromagnets 3012, 3013, 3014, 3015, or 3016 of the electromagnetic devices 3011 is energized, releasing the corresponding bellcrank 3059. It will be recalled that upon release of a bellcrank lever 3059, bail 3091 closes switch 3093 (PCC), which lies directly behind switch 3094 in FIG. 4, to energize magnet 3095 (PCM) over the circuit beginning with bridge 3144, over conductor 3147, closed switch 3129 (PTC), conductor 3160, closed switch 3094 (PLC), conductors 3163, 3165 and 3166, closed switch 3093 (PCC), conductor 3169 to punch clutch magnet 3095 (PCM), conductors 3170, 4451, and 3148 to bridge 3144.

As explained hereinbefore, the tape perforator 2 may be operated to feed the tape 3008 through the apparatus without recording code signals thereon, and for this purpose, a manually operated key is provided to control switches 3171 (SW7B) and 4298 (SW7A) (FIGS. 1 and 7). Switch 4298 (SW7A) and switch 3171 (SW7B) are mechanically connected and operated simultaneously to control the punch clutch magnet 3095 (PCM). As explained before, the closure of switch 4298 (SW7A) effects energization of motor 4282, while the closure of switch 3171 (SW7B) completes a circuit to the punch clutch magnet 3095 (PCM) over a circuit beginning with bridge 3144 through conductor 3147, closed switch 3129 (PTC), conductor 3160, closed switch 3094 (PLC), conductors 3163, 3165 and 3172, closed switch 3171 (SW7B), conductors 3175 and 3169 to clutch magnet 3095, thence over conductors 3170, 4451, and 3148 to bridge 3144.

The diodes 3176 and 3177 (FIG. 7), shown as being connected around the operating coils of the respective electromagnetic devices 4440 (R1) and 3095 (PCM), and the diodes 3178, 3179, 3180, 3181 and 3182 (FIG. 8), shown as being connected around the operating coils of the respective electromagnets 3012, 3013, 3014, 3015 and 3016, are included in the electrical system for the purpose of providing, in each case, a low impedance path for the E.M.F. generated by the collapse of the field around the coil and serve to smooth out the operating pulses. The diodes shown in connection with the readout switch 4000 such, for example, as the diodes 4353, 4361, 4367, 4373 and 4444, and the diodes 4512, 4514, 4517, 4520 and 4522 are provided to maintain the direction of current flow in the system and prevent back leakage of pulses therein.

*Diode board*

Figure 15:
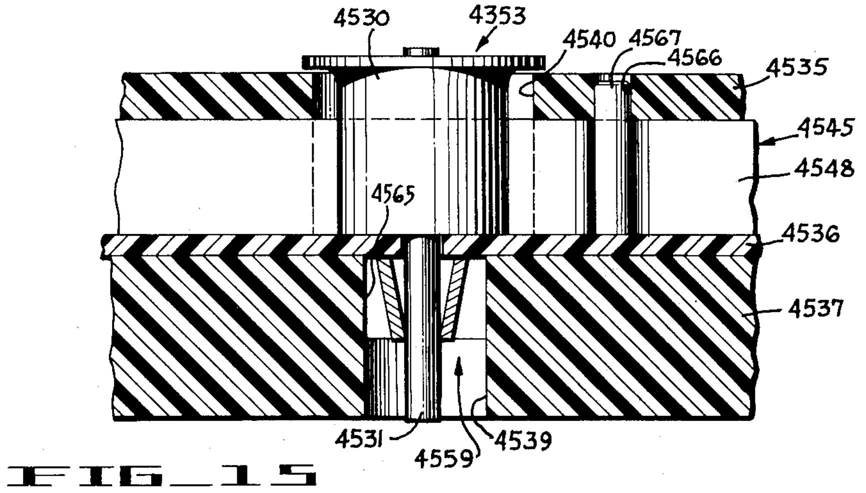
FIG. 15 is a fragmentary sectional elevational view of the diode panel showing a diode positioned in the panel, the view being taken on the line 15—15 in FIG. 14.

The diodes, such as 4353 shown in FIG. 15, are cartridge type electrical elements comprising a metal casing 4530, which provides one terminal for the diode, and a pin-type terminal 4531. The diodes are removably mounted in an ordinal arrangement in a diode board, generally indicated at 4532 (FIGS. 9 and 11), which is supported on the underside of the machine by any suitable means, such as machine screws 4533 (FIG. 4) and is protected from dust and damage by a suitable cover 4534, also supported on the base of the machine by means not shown.

The diode board 4532 is comprised of three laminations 4535, 4536, and 4537 of suitable electrical insulating material and, upon assembly, form a unit held together by any suitable means, such as screws 4538. The panel lamination 4535 is provided with a series of columns of small apertures 4539 (FIG. 9) the spacing between the apertures 4539 in each column being equal to the columnar spacing of the apertures. Panel 4537 (FIG. 11), similar in size and thickness to panel 4535, is like wise provided with a series of columns of apertures, these apertures 4540 having a larger diameter than apertures 4539. The apertures 4540 are equal in number to the smaller apertures 4539 in panel 4535 and have a vertical and horizontal center-to-center spacing equal to that of the smaller apertures in the panel 4535. Panel 4535 is also provided with alternate columns of the large apertures 4540 positioned on the center line between each adjacent pair of columns of small apertures 4539 and having the corersponding apertures 4540 in each column lying on the horizontal center line between adjacent rows of the small apertures 4539. Thus, it becomes apparent that the vertical and horizontal center-to-center spacing between the apertures 4540 in panel 4535 is equivalent to that of the small apertures 4539.

The provision of small apertures 4539 in panel 4537 is similar in arrangement to that of the large apertures 4540 in panel 4535. Each alternate column of the apertures 4539 is positioned on the vertical center line between adjacent columns of apertures 4540 and the corresponding apertures 4539 in each column are arranged in rows on the horizontal center line between adjacent rows of apertures 4540. Hence, the vertical and horizontal center-to-center distance between adjacent apertures 4539 and between adjacent apertures 4540 in each panel 4535 and 4537 is identical.

A row of equally spaced apertures 4540 is provided in panel 4535, one aperture 4540 for each column of apertures 4539. Panel 4537 is likewise provided with a row of equally spaced apertures 4539, one for each column of apertures 4540. Each of these horizontal rows of apertures is positioned adjacent the lower end of the respective panels with each aperture 4540 in the one row aligned with a corresponding column of apertures 4539 in panel 4535 and with each aperture 4539 in the other row aligned with a corresponding column of apertures 4540 in panel 4537. From the foregoing, it can be seen that there are an equal number of apertures 4539 and 4540 in each of the panels.

Figure 10:
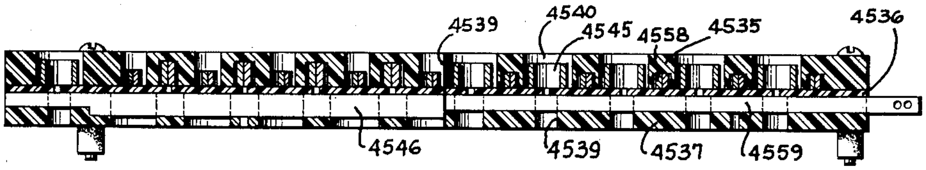
FIG. 10 is a sectional view of the diode panel, the view being taken on line 10—10 in FIG. 9.
Figure 14:
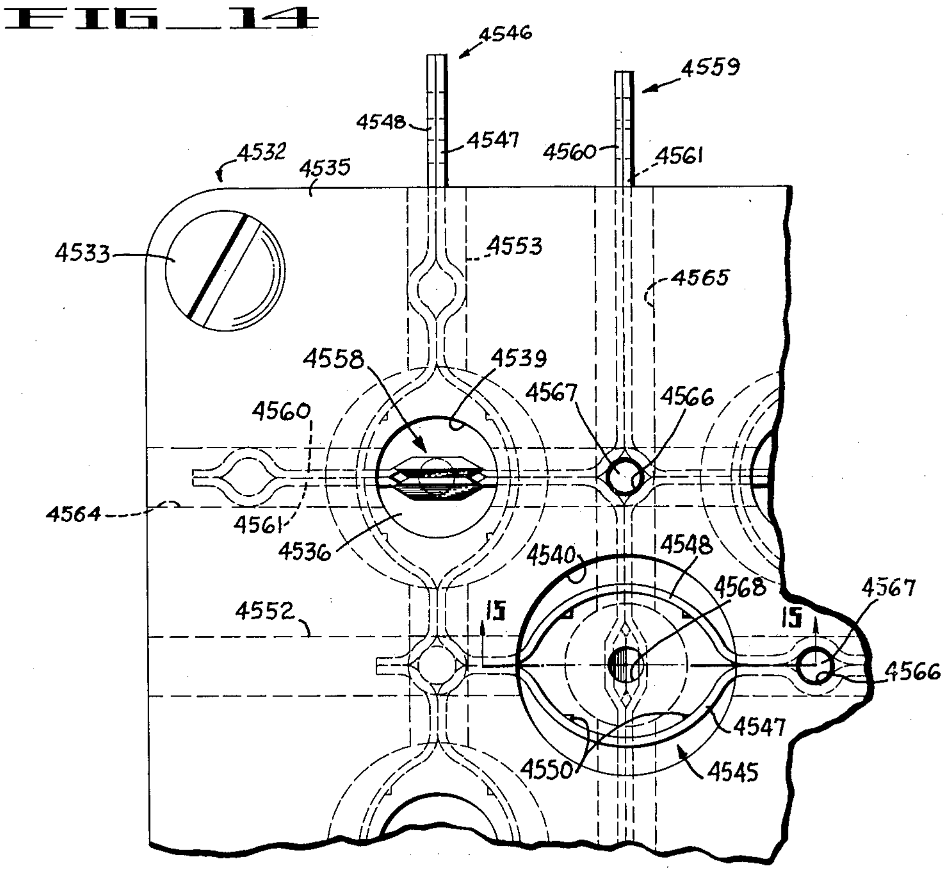
FIG. 14 is an enlarged fragmentary plan view of the upper face of the diode panel showing the arrangement of the conductor elements.

The columnar and row arrangement of the small apertures 4539 and large apertures 4540 in each panel 4535 and 4537 is such that, upon securing the panels 4535 and 4537 together, the small apertures 4539 and large apertures 4540 in panel 4535 will be concentric with the large apertures 4540 and small apertures 4539, respectively, in panel 4537, as seen in FIGS. 10 and 14. By this arrangement of the apertures in the panels 4535 and 4537, the assembled diode board 4532 may support more diodes and accommodate more circuits than is possible in diode boards now in use.

An electrical conductor element is provided for each horizontal row of large apertures 4540 in panel 4535 and for each column of apertures 4540 in panel 4537. Each of the conductor elements 4545 (FIG. 9) is of sufficient length to extend from the left edge of panel 4535 through each of the large apertures 4540 in the corresponding row beyond the right edge of panel 4535 to provide a terminal therefor. Similarly, each conductor element 4546 extends from the lower edge of panel 4537 through each large aperture 4540 in the corresponding column and at right angles to elements 4545 and extends beyond the upper edge of panel 4537 to provide a terminal. Inasmuch as each of the elements 4545 and 4546 are similar in construction, it is believed that a description of one will suffice for all.

Figure 12:
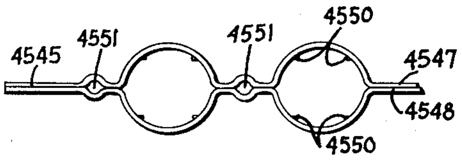
FIG. 12 is a fragmentary detail of a supporting conductor for the casing terminal of the diodes.

Each of conductor elements 4545 and 4546 comprises a pair of conductor strips 4547 and 4548 (FIG. 12) of any electrical conductive material having resilient characteristics, such, for example, as beryllium copper. At regular intervals equal to the horizontal or vertical spacing between the large apertures 4540, each strip 4547 and 4548 is formed in such a manner that, upon positioning the strips 4547 and 4548 side-by-side, an opening is provided therebetween substantially elliptical in shape. A pair of extrusions 4550 is provided in spaced-apart relation in each wall of the ellipse formed by the contiguous strips 4547 and 4548, the dimension across the minor axis of the ellipse being sufficiently less than the diameter of the metal casing 4530 of the diode to cause the extrusions 4550 to scratch the surface of the diode upon insertion therein, thereby giving a more efficient electrical contact. Also, at predetermined intervals, each of the strips 4547 and 4548 is formed in a manner such that upon placing the strips side-by-side, a small aperture 4551 is provided to receive a pin, for purposes to be described hereinafter.

Each of the panels 4535 and 4537 is provided with a series of alternate channels, or ducts, 4552 and 4553, respectively, for receiving the respective conductor elements 4545 and 4546. Each of the channels 4552 in one face of panel 4535 is of a depth substantially equivalent to the width of the strips 4547 and 4548 and of a width substantially that of the outside diameter, taken through the center of the apertures 4551. Each channel, or duct, 4552 extends from the left edge to the right edge of panel 4535, intersecting each large aperture 4540 in the corresponding row on the center line thereof. Each channel 4553, similar to channels 4552, extend from the lower edge to the upper edge of panel 4537, intersecting each aperture 4540 in the corresponding column on the center line thereof. Each channel 4553 also intersects the small aperture 4539 adjacent the lower edge of panel 4537 and aligned with each column of apertures 4540. Upon insertion of the elements 4545 and 4546 into the respective ducts 4552 and 4553, the substantially elliptical openings, provided by the juxtapositioning of the formed strips 4547 and 4548, are positioned within each large aperture 4540 (FIG. 14) in the respective corresponding row and column to receive and resiliently secure the diodes in place.

Figure 13:
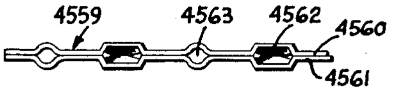
FIG. 13 is a fragmentary detail of a conductor providing an electrical connection with the pin terminals of the diodes.

A series of similar conductor elements 4558 and 4559 are utilized to provide an electrical connection for the pin terminal of each of the diodes inserted in the respective panels 4535 and 4537. The conductor elements 4558 and 4559 are similar in construction and it is therefore believed that a description of one will suffice for all. Each of the elements 4558 and 4559 comprises a pair of electrical conductor strips 4560 and 4561 (FIG. 13) of a resilient electrical conductive material such, for example, as beryllium copper, and are normally positioned side-by-side to form a unit, as shown in FIG. 13. The face of each strip 4560 and 4561 is extruded at regular intervals along its length providing a taper from the bottom edge to the upper edge of the extruded portion so that, upon juxtapositioning of the strips 4560 and 4561, an opening 4562 is formed which is substantially rectangular in shape, as viewed in FIG. 13, and V-shaped in cross-section, as seen in FIG. 15. A substantially semicircular form is provided in each strip 4560 and 4561, intermediate the penultimate and last extrusion adjacent each end of each of the strips, so that upon side-by-side positioning of the strips 4560 and 4561, the semicircular form in the strips provides an opening 4563, intermediate the openings 4562, to receive a pin which is effective to secure the elements 4558 and 4559 in position. A series of channels, or ducts, 4564 is provided in the channeled face of panel 4535 and are of a width equal to that of the alternate parallel channels, or ducts, 4552 and a depth substantially equal to the width of the strips 4560 and 4561. Each channel, or duct, 4564 extends transversely of panel 4535, intersection each small aperture 4539 in the corresponding row of apertures on the center line thereof. The juxtapositioned strips 4560, 4561 forming elements 4558 are inserted in each channel 4564 in a manner such that the openings 4562 are centered within the apertures 4539 in the corresponding row, as seen in FIG. 14.

A series of channels 4565, similar to channels 4564, are provided in the channeled face of panel 4537 intermediate each adjacent pair of channels 4553 and parallel therewith. Each of the channels, or ducts 4565 extends longitudinally of the panel 4537, intersecting each aperture in the corresponding column of small apertures 4539 on the center line thereof. Each element of the series of conductor elements 4559, comprising strips 4560 and 4561, is positioned in a channel 4565 and secured therein by means to be described hereinafter, so that the openings 4562 are centered relative to the apertures 4539 in the corresponding column.

Means are provided for use in each panel 4535 and 4537 to reduce the tendency of elements 4545, 4558 and 4546, 4559 of the respective panels to shrink lengthwise as the diodes for each row and column are inserted into the opening provided in the respective elements. For this purpose, a series of pin apertures 4566 (FIG. 15) are provided in each panel 4535 and 4537, one between each of the first two apertures at each end of each row of apertures in panel 4535 and at each end of each column of apertures in panel 4537. Each aperture 4566 is aligned for cooperation with the corresponding opening 4551 and 4563 in respective elements 4545, 4546 and 4558, 4559. The pin apertures 4566 extend through the panels 4535 and 4537 into the transversely and longitudinally disposed channels or ducts. A slightly tapered pin 4567 (FIGS. 9, 11, 14 and 15) is provided for each of the pin apertures 4566 and are of a length slightly less than the thickness of either of the panels 4535 or 4537. Upon insertion of the conductor elements 4545, 4546 and 4558, 4559 into the proper channels, pins 4567 are inserted into the apertures 4566 and into the aligned openings 4551 and 4563, respectively, in the corresponding elements 4545, 4556 and 4558, 4559. The use of the pins 4567 not only serves to greatly reduce the shrinkage in the length of each element, as explained above, but also makes it possible to increase the number of circuits controlled by the board. To provide a predetermined number of additional circuits, selected conductor elements 4545, 4546, 4558 and 4559 may be severed to isolate each end of the element for a separate circuit. If desired, the conductor elements may be extended beyond each edge of the board 4532, thus providing a terminal on all four edges so that upon severence of the extended elements, a plurality of additional selective circuits may be provided.

The insulating lamination 4536 (FIGS. 10 and 15) is secured in position between the channeled faces of each of panels 4535 and 4537, upon assembly of the diode board 4532, to insulate elements 4545 and 4558 in panel 4535 from elements 4546 and 4559 in panel 4537. Insulating lamination 4536 is provided with a series of perforations 4568 spaced-apart vertically and horizontally in accordance with the spacing between apertures 4539 and 4540 in panel 4535. Each perforation 4568 is positioned for concentricity with the large aperture 4540 and the corresponding concentric aperture 4539 and is of a diameter sufficiently larger than the pin terminal 4531 of the diode to serve as a guide therefor, upon insertion of the diode into the corresponding aperture 4540.

As explained above, extrusions 4550 in each wall of the ellipses formed in elements 4545 and 4546 are effective to scratch the surface of the casing of the diode to provide electrical contact therebetween. As seen in FIG. 15, upon insertion of the pin terminal 4531 of the diode into the opening 4562 provided therefor in the corresponding element 4558 or 4559, the lower edges of the deformation 4562 serve to scratch the pin terminal 4531, thereby providing a good electrical contact therewith.

A series of painted lines is applied to each panel 4535 and 4537 by the silk screen process and encompass each alternate row and column of apertures 4540 on each panel to more quickly ascertain or determine circuits utilized.

Figure 16:
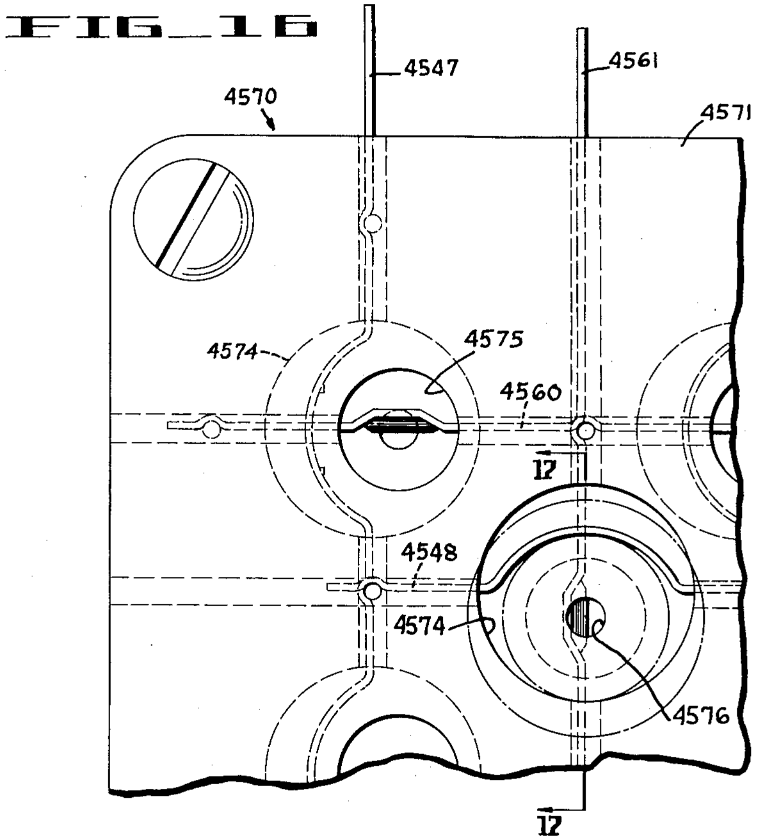
FIG. 16 is a modification of the arrangement of the conductor elements shown in FIG. 14.
Figure 17:
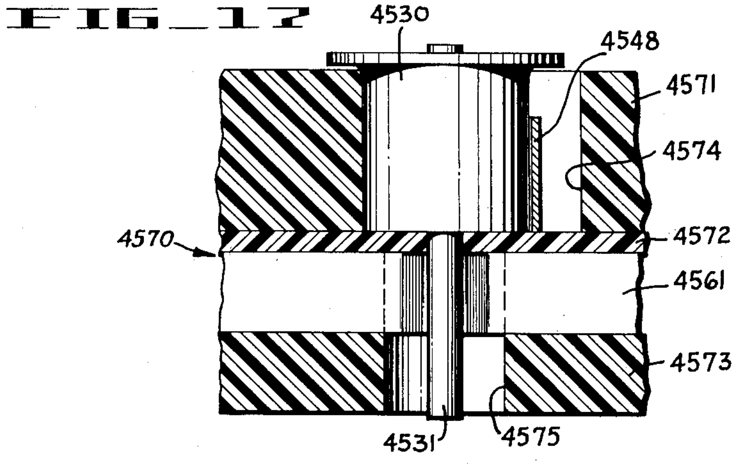
FIG. 17 is a view similar to FIG. 15 utilizing one conductor strip in each channel.

A modification of the diode board 4532, described above, is shown in FIGS. 16 and 17. The modified diode board, indicated generally at 4570, is functionally similar to diode board 4532 and utilizes but one conductor strip 4548 and 4560 in alternate channels in a lamination, or panel, 4571, strips 4548 in those chanels intersecting apertures 4574 and strips 4560 in those channels intersecting apertures 4575. One strip 4547 is likewise provided for each channel associated with the apertures 4574 in panel 4573, and a strip 4561 is inserted in each channel intersecting the apertures 4575 in this same panel. Each of the conductor strips 4547, 4548 and 4560, 4561 are identical to the corresponding strips in the diode board 4532. However, the position of the large apertures 4574 in panels 4571 and 4573 are offset relative to the corresponding small apertures 4575 in the opposed panel. The offset of the large apertures 4574 relative to the corresponding small apertures 4575 enables the resiliency of the conductor strips 4547 and 4548 in the large apertures 4574 to maintain the inserted diode against the opposite wall of the aperture to more securely retain the inserted diode in the board 4570. The perforations 4576 provided in the insulating lamination 4572 are concentric with each of the small apertures 4575 in each panel, or lamination, 4571 and 4573. With the use of one conductor strip in each channel instead of two, as described above, the production cost and assembly time for each board 4570 is greatly reduced.

Figure 9:
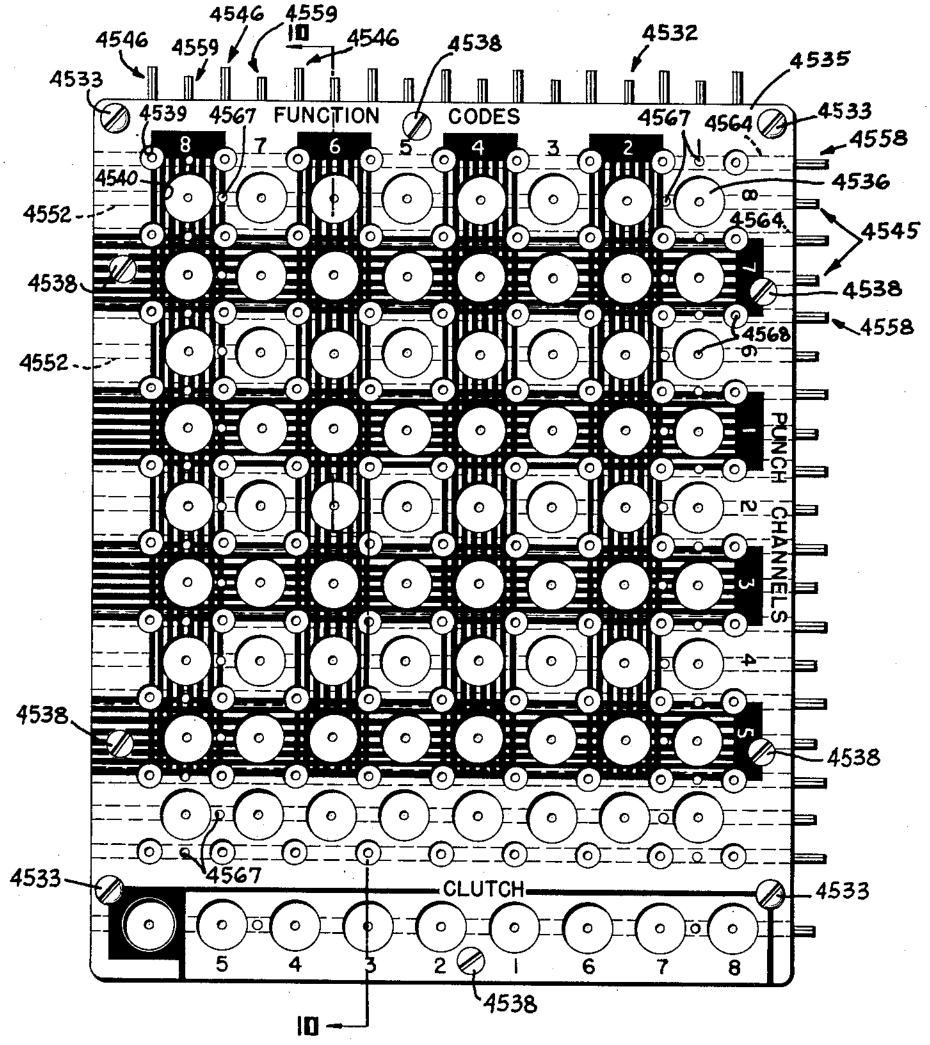
FIG. 9 is a plan view of the upper face of the diode panel.
Figure 11:
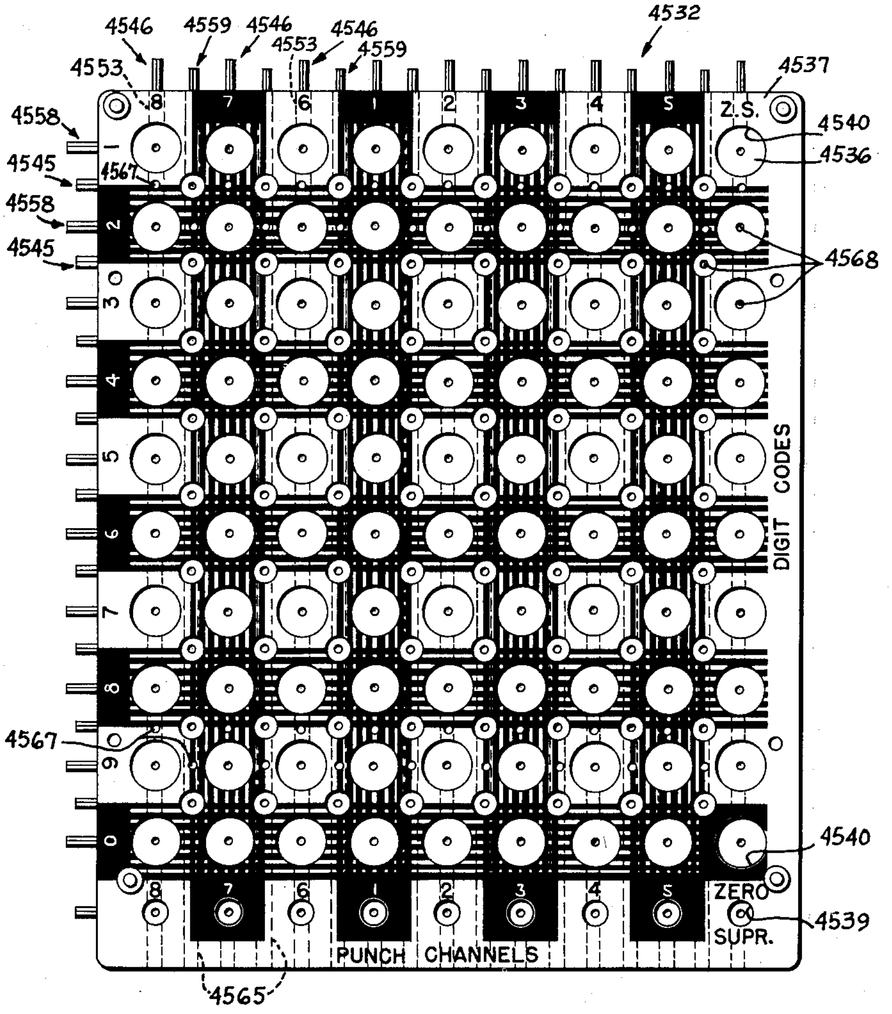
FIG. 11 is a plan view of the lower face of the diode panel.

Refering to FIGS. 9, 11 and 14, it becomes readily apparent that the matrix arrangement of the diode board permits a universal numerical coding and/or functional coding with great flexibility possible, due to the fact the diodes can be quickly and easily arranged. Upon electrically connecting any one or all of the conductor elements 4558 and 4559 with the respective elements 4546 and 4545 by the insertion of a diode in selected apertures 4540 or in all of the apertures 4540, the flow of current may be selectively controlled to complete a multiplicity of circuits in a plurality of combinations in the electrical system of a device. For example, an electrical connection with the top conductor element 4558 in FIG. 9 will complete a circuit to one or all of the conductor elements 4546 in accordance with the number of diodes inserted in the upper row of large apertures 4540 in FIG. 11.

To exemplify the function of diode board 4532 in the electrical system of the device disclosed above, conductor 4031 (FIG. 8) is connected to the upper conductor element 4558 (FIGS. 10 and 11) and conductors 4354, 4362, 4368 and 4374 (FIG. 8) are electrically connected to electrical conductor strips 4546 associated with the respective columns numbered "1," "2," "3," "5," and the column marked "Z.S." in FIG. 11. Thus, it can be seen that with a diode inserted in the upper apertures 4540 in each of these columns, the release of current through conductor 4031 would be effective to energize electromagnets 3012, 3013, 3014 and 3016, and with the connection of conductor 4445 (FIG. 8) with connector element 4546 in the column marked "Z.S.," the energization of relay 4440 will be effected.

I claim:

1. In an electrical system, a plurality of sets of electrical components, a first series of conductors in pairs, one pair of said first series of conductors for each of said sets of components, each pair of said first series of conductors having a plurality of expansible portions equally spaced along the length of the conductors for the insertion of the components in each set of components therebetween, inwardly opposed projections on the expansible portions of each conductor of said pairs of conductors operable to removably support the inserted components and to provide an electrical connection between each pair of conductors of said first series of conductors with one terminal of the inserted components, a second series of conductors in pairs extending transversely of and in a plane parallel to said first series of conductors, each pair of conductors of said second series of conductors having openings therebetween corresponding to the expansible portions of each pair of conductors in said first series of conductors at the point of intersection of said second series of conductors with said first series of conductors, the said openings providing a frictional electrical connection for the other terminal of the components inserted in the corresponding expansible portions of said first series of conductors, and an insulating means for immovably supporting said first and said second series of conductors whereby the linear extension of one series of conductors is maintained angularly displaced relative to the linear extension of the other series of conductors and in spaced relation one with the other, said insulating means having a plurality of apertures extending therethrough at the points of intersection of said second series of conductors with said first series of conductors to enable the selective insertion and removal of each of said sets of components.

2. In an electrical system, a plurality of electrical components, each component having a pin terminal and a metal casing providing the other terminal therefor, a series of equally spaced parallel pairs of conductor strips, the strips of each pair of conductor strips positioned side-by-side and separated at equally spaced intervals to form substantially elliptical openings for the insertion of said components thereinto, a plurality of pairs of spaced-apart extrusions formed in each conductor strip, each pair of extrusions in one of each pair of conductor strips projecting inwardly of each elliptical opening in opposition to the corresponding pair of extrusions in the other of each pair of conductor strips operable to resiliently seize the metal casing of the inserted components providing an electrical connection therebetween and removably supporting the inserted components within the elliptical openings, a series of parallel pairs of contiguous conductor elements extending transversely of said series of pairs of conductor strips in a plane parallel thereto and equally spaced in accordance with the spacing of the elliptical openings formed at intervals between the conductor strips of each pair of strips, each pair of elements intersecting the corresponding one of the elliptical openings formed along the length of each pair of said series of pairs of conductor strips providing a frictional electrical connection for the pin terminal of the corresponding component at the point of intersection of each pair of conductor elements with each pair of conductor strips, and insulating means for supporting said series of conductor strips and said series of conductor elements in operative spaced relation one with the other.

3. In an electrical system for a computing device, a source of current, a plurality of diodes, means for mounting said diodes comprising a panel of insulating material having a first series of equally spaced parallel ducts extending transversely of said panel in one plane and a second series of similarly spaced parallel ducts extending longitudinally of said panel in a second plane and at right angles to said first series of ducts, said panel having two parallel planar surfaces, one planar surface of said panel being provided with a first series of rows of equally spaced recesses opening into the alternate ones of the said first series of ducts on the center lines thereof at the point of crossover of said alternate ones of said first series of ducts with said second series of ducts, the spacing between the recesses in each row being equivalent to the spacing between the said rows, the other planar surface of said panel being provided with a second series of rows of equally spaced recesses opening into the alternate ones of the said second series of ducts on the center lines thereof at the point of crossover of said alternate ones of said second series of ducts with other than the alternate ones of said first series of ducts, a series of rows of apertures in the first-mentioned planar surface of said panel opening into the other of the said first series of ducts concentric with the recesses in the other planar surface of said panel and a series of rows of apertures in the other planar surface of said panel opening into the other of the said second series of ducts concentric with the recesses in the first-mentioned planar surface of said panel, a conductor strip in each alternate duct of the said first and said second series of ducts operable to removably support each of said diodes within corresponding ones of said recesses providing a frictional electrical contact therewith, and a terminal conductor in each of the other of the ducts in said first and said second series of ducts operable to provide a frictional connection with a terminal of each of the corresponding diodes, each conductor strip and terminal conductor being extended beyond the extremities of the panel to provide an outside terminal.

4. In an electrical system for a computing device, a source of current, a plurality of diodes having casing terminals and pin terminals, a laminated panel for mounting said diodes comprising a pair of insulating laminations of equal size, the first lamination of said pair of laminations being provided with a series of equally spaced parallel rows of openings for receiving the casing terminal of a certain number of said plurality of diodes and a corresponding series of linear channels in one face of said first lamination intersecting each opening in a corresponding row, the second lamination of said pair of lamiations being provided with a similar series of equally spaced parallel rows of openings alternately arranged with respect to the openings in said first mentioned lamination for receiving the casing terminal of the other of said plurality of diodes and a corresponding series of linear channels in one face of said second lamination intersecting each opening in a corresponding row and extending at a right angle to that of the linear channels in said first lamination, each lamination of said pair of laminations having a series of parallel rows of apertures lying between and parallel to the rows of openings in the corresponding lamination with the apertures in one lamination being concentric with the openings in the other lamination to accommodate the pin terminal of each of said diodes, a series of parallel strip channels in the said one face of each of said laminations, one said strip channel between adjacent linear channels connecting the apertures in each corresponding row of apertures, a plurality of pairs of conductor strips, one pair of strips for each of the linear channels positioned side-by-side therein and separated within each opening to form substantially an ellipse with the dimension of the minor axis being less than the diameter of the casing terminal of said diodes, a plurality of pairs of extrusions in each strip of each pair of conductor strips, a pair of said extrusions extending inwardly from each wall of each formed ellipse operable to seize the casing terminal of the inserted diode thereby removably securing each of said diodes in position in said laminations and providing an electrical connection betwen each pair of conductor strips and the corresponding diodes, a pair of contiguous strip conductors positioned in each of said strip channels and expanded sufficiently within each aperture to receive the pin terminal of each of said diodes and provide a frictional connection therebetween, each pair of said conductor strips and strip conductors being of a length sufficient to extend beyond the outer extremities of said laminations to provide outside terminals, an insulating plate positioned between each of said laminations to provide electrical insulation between the conductor strips and strip conductors in each lamination and having a plurality of orifices therein concentric with each opening and corresponding aperture to permit the passage therethrough of the pin terminal of each of said diodes, and a plurality of pins secured in each of said laminations, two of said pins for each of said pair of conductor strips and strip conductors operable to secure said conductors in position relative to the openings in said laminations.

5. A diode board in an electrical system comprising a set of diodes for maintaining the direction of current flow, each of said diodes having a body terminal portion and a pin terminal portion, an insulating panel for mounting said diodes having a series of rows of openings in one face thereof arranged longitudinally of said panel for receiving the body terminal portion of said set of diodes and a corresponding series of rows of apertures in the other face of said panel arranged transversely of said panel concentric with the said openings for accommodating the pin terminals of said diodes, each aligned opening and aperture being of a depth less than one-half the distance between the faces of the said panel, an insulating portion of said panel separating each opening from the aligned aperture and having perforations therein concentric with said openings to permit the passage of the pin terminal of the inserted diode therethrough, a first series of ducts in said panel, one duct for each row of openings intersecting each opening in the row and extending in one direction to one edge of the panel, a second series of ducts in said panel, one duct for each row of apertures intersecting each aperture in the row and extending to a second edge of the panel, a conductor element in each duct of the first series of ducts formed within each opening to removably support an inserted diode, each formed portion of each of said conductor elements being provided with a plurality of extrusions for seizing the body terminal portion of an inserted diode thereby electrically connecting the conductor elements to the diodes, and a terminal conductor in each of the second series of ducts providing a frictional connection within each aperture in the corresponding row of apertures with the pin terminal of the diode inserted in the aligned opening.

6. In an electrical system having a plurality of selectively controlled electrical circuits, a set of electrical components for selectively controlling the flow of current in said electrical circuits, each of said components having a body portion as one terminal thereof and a pin-like extension as the other terminal thereof, and means for removably supporting each component of said set of components including an insulated panel having parallel planar surfaces and a plurality of openings in each of said planar surfaces, the said openings in one planar surface of said panel being concentric with the said openings in the other planar surface of said panel and arranged in equally spaced relation in rows extending longitudinally and transversely of said panel, a first series of conductor elements within said panel, one of said first series of conductor elements for each longitudinal row of openings in one planar surface of said panel passing diametrically through each opening in the row and having a receptacle portion in each opening for receiving the body portion of an inserted one of said components, a second series of conductor elements within said panel, one of said second series of conductor elements for each transverse row of openings in the other planar surface of said panel passing diametrically through each opening in the row and having a connector portion in each opening for frictionally connecting the one of said second series of conductor elements with the pin-like terminal of the inserted component, an insulating member for insulating said first series of conductor elements from said second series of conductor elements, and a plurality of groups of spurs on each of said first series of conductor elements, one of said groups of spurs for each receptacle portion of each of said first series of conductors operable to seize the body portion of an inserted component thereby providing an electrical connection with the component and detachably securing the component in the corresponding opening.

References Cited in the file of this patent

UNITED STATES PATENTS

| | | |
|---|---|---|
| 2,215,667 | Sherman | Sept. 24, 1940 |
| 2,611,010 | Sass | Sept. 16, 1952 |
| 2,821,691 | Andre | Jan. 28, 1958 |
| 2,902,628 | Leno | Sept. 1, 1959 |
| 2,907,926 | Slack | Oct. 6, 1959 |

FOREIGN PATENTS

| | | |
|---|---|---|
| 750,244 | Great Britain | Aug. 13, 1954 |

UNITED STATES PATENT OFFICE

CERTIFICATE OF CORRECTION

Patent No. 2,990,499 June 27, 1961

Harry W. Cordes

It is hereby certified that error appears in the above numbered patent requiring correction and that the said Letters Patent should read as corrected below.

Column 5, line 39, for "400" read -- 4000 --; column 11, line 71, for "whcih" read -- which --; line 75, for "Tht" read -- The --; column 17, line 36, after "(FIG. 4)" insert a comma; line 44, after "(FIG. 9)" insert a comma; column 20, line 39, after "determine" insert -- particular --; line 46, for "chanels" read -- channels --; line 73, for "arranged" read -- rearranged --.

Signed and sealed this 16th day of January 1962.

(SEAL)
Attest:

ERNEST W. SWIDER
Attesting Officer

DAVID L. LADD
Commissioner of Patents